United States Patent [19]
Weems et al.

[11] Patent Number: 5,600,689
[45] Date of Patent: Feb. 4, 1997

[54] METHOD AND APPARATUS FOR REPAIRING BOILING WATER REACTOR SHROUDS UTILIZING TIE-RODS WITH MULTIPLE LONGITUDINAL MEMBERS

[75] Inventors: Sterling J. Weems, Chevy Chase, Md.; Noman Cole, Mason Neck; H. William McCurdy, Vienna, both of Va.

[73] Assignee: MPR Associates, Inc., Alexandria, Va.

[21] Appl. No.: 358,085

[22] Filed: Dec. 15, 1994

Related U.S. Application Data

[63] Continuation-in-part of Ser. No. 190,796, Feb. 2, 1994, Pat. No. 5,402,570, which is a continuation-in-part of Ser. No. 329,409, Oct. 27, 1994, abandoned.

[51] Int. Cl.⁶ .................... G21C 11/00; G21C 5/10
[52] U.S. Cl. .................... 376/302; 376/285; 376/292
[58] Field of Search .................... 376/260, 285, 376/287, 292, 302, 303, 304, 461; 52/223.13, 698

[56] References Cited

U.S. PATENT DOCUMENTS

| | | | |
|---|---|---|---|
| 1,994,322 | 3/1935 | O'Neil | 52/698 |
| 2,865,828 | 12/1958 | Long et al. | 376/304 |
| 2,929,236 | 3/1960 | Steward et al. | 52/223.3 |
| 2,950,576 | 8/1960 | Rubenstein | 52/223.13 |
| 3,011,962 | 12/1961 | Koch et al. | 376/302 |
| 3,116,214 | 12/1963 | Greenstreet | 376/304 |
| 3,215,608 | 11/1965 | Guenther | 376/302 |
| 3,445,971 | 5/1969 | Desmarchais et al. | 376/461 |
| 3,627,634 | 12/1971 | Guenther et al. | 376/303 |
| 3,719,555 | 3/1973 | Davis | 376/341 |
| 3,720,581 | 3/1973 | Kaser | 376/287 |
| 3,733,760 | 5/1973 | Koerner | 376/296 |
| 3,744,660 | 7/1973 | Gaines et al. | 376/294 |
| 3,785,924 | 1/1974 | Notari | 376/287 |
| 3,850,795 | 11/1974 | Thome | 376/302 |
| 3,910,447 | 10/1975 | Bevilacqua | 376/461 |

(List continued on next page.)

FOREIGN PATENT DOCUMENTS

| | | |
|---|---|---|
| 2107382 | 4/1972 | France . |
| 1958152 | 8/1970 | Germany . |
| 2024630 | 1/1971 | Germany . |
| 2361416 | 4/1975 | Germany . |
| 2643011 | 3/1978 | Germany . |
| 257958 | 7/1988 | Germany . |
| 4106391 | 9/1992 | Germany . |
| 1787095 | 1/1993 | Russian Federation . |
| 1404614 | 6/1988 | U.S.S.R. . |
| 1271594 | 4/1972 | United Kingdom . |

OTHER PUBLICATIONS

J. S. Abel et al, "Applicability of Pipelocks as a Remedy for Intergranular Stress Corrosion Cracking in BWR's," *Int. J. Pres. Ves & Piping 25*, pp. 25–46 (1986).

J. S. Abel et al, "Mechanical Methods of Improving Resistance to Stress Corrosion Cracking in BWR Piping Systems," Int. J. Pres. Ves. & Piping 34, pp. 17–29 (1988).

(List continued on next page.)

*Primary Examiner*—Daniel D. Wasil

[57] ABSTRACT

A method and apparatus for repairing nuclear reactor core shrouds includes applying vertical compressive forces to the shroud in situ to urge opposed ends of the shroud toward one another using a plurality of tie-rods, each including a plurality of coaxial longitudinal members separated by a radial gap filled with reactor coolant or some other damping fluid. One of the longitudinal members is secured to upper and lower portions of the shroud for maintaining a sufficient preload to hold the shroud together and is coupled with one or more other longitudinal members in a manner to transmit axial loads thereto upon extending a predetermined axial distance. A plurality of radial spacers can also be positioned at longitudinally spaced locations along the length of the tie-rod to assure control rod insertion by limiting lateral movement of the shroud and can reduce the preload required for preventing the formation of new cracks and stabilizing existing cracks.

34 Claims, 21 Drawing Sheets

U.S. PATENT DOCUMENTS

| | | | |
|---|---|---|---|
| 3,926,722 | 12/1975 | Dupen | 376/287 |
| 3,994,776 | 11/1976 | Keller | 376/289 |
| 4,011,132 | 3/1977 | Kumpf et al. | 376/294 |
| 4,053,080 | 10/1977 | Daublebsky | 376/294 |
| 4,055,920 | 11/1977 | Becker | 52/223.13 |
| 4,056,036 | 11/1977 | Kamann et al. | 52/698 |
| 4,057,162 | 11/1977 | Gross | 376/294 |
| 4,073,685 | 2/1978 | Brown et al. | 376/302 |
| 4,092,215 | 5/1978 | Mutzl | 376/287 |
| 4,111,327 | 9/1978 | Janakiev | 376/294 |
| 4,165,021 | 8/1979 | Dorling | 220/468 |
| 4,192,718 | 3/1980 | Janakiev | 376/294 |
| 4,199,403 | 4/1980 | Puri et al. | 376/302 |
| 4,199,994 | 4/1980 | Beine et al. | 376/249 |
| 4,223,797 | 9/1980 | Skakunov | 220/565 |
| 4,265,010 | 5/1981 | Doss et al. | 376/261 |
| 4,285,503 | 8/1981 | Calhoun et al. | 29/890.031 |
| 4,299,658 | 11/1981 | Meuschke et al. | 376/260 |
| 4,322,880 | 4/1982 | Lampe | 220/586 |
| 4,379,119 | 4/1983 | Fujimoto | 376/302 |
| 4,409,179 | 10/1983 | Burger | 376/302 |
| 4,562,332 | 12/1985 | Walter et al. | 29/402.01 |
| 4,585,091 | 4/1986 | Budd | 29/402.15 |
| 4,596,689 | 6/1986 | Gorholt et al. | 376/302 |
| 4,652,426 | 3/1987 | Boyle et al. | 376/352 |
| 4,760,678 | 8/1988 | Chambers | 52/698 |
| 4,789,520 | 12/1988 | Morimoto et al. | 376/428 |
| 5,265,392 | 11/1993 | Pedrocco | 52/167.8 |
| 5,274,683 | 12/1993 | Broda et al. | 376/260 |
| 5,319,692 | 6/1994 | Hopkins et al. | 376/302 |
| 5,392,322 | 2/1995 | Whitling et al. | 376/302 |
| 5,402,570 | 4/1995 | Weems et al. | 376/302 |
| 5,430,779 | 7/1995 | Baversten et al. | 376/302 |

OTHER PUBLICATIONS

Consumers Power Company, "Report of Operation of Big Rock Point Nuclear Plant," Docket No. 50–155, Forty Pages (Nov. 30, 1964).

Consumers Power Company, "Report of Operation of Big Rock Point Nuclear Plant," Docket No. 50–155, Six Pages (Dec. 30, 1965).

J. E. Corr, "Big Rock Point Nuclear Plant Thermal Shield Instability, Part 1, Redesign and Test Programs," General Electric, San Jose, California, Seventy–Three Pages (Nov. 3, 1966).

BWR Owner's Group, "Recommendations on Inservice Inspection of BWR Internal Components and Attachments," Presented to ASME Section XI Subcommittee on Nuclear Inservice Inspection, 29 Pages (Apr. 1991).

Baltimore Gas and Electric, "Updated Final Safety Analysis Report—Calvert Cliffs, Nuclear Power Plant," Forty–Five Pages (Jul. 20, 1982).

Illustrations of Haddam Neck Nuclear Plant, Figs. 5.3–4 and 04.2–10 (Mar. 1991 and Jun. 1994).

Illustrations of Hatch Nuclear Plant Fig. 3.3–1, Fig. 4.1–1, Fig. 4,2–9 & Fig. 4.1–4.

Kewaunee Reactor Vessel Schematic, Fig. 3.2–1 and Fig 4.2–2, Three Pages (Jul. 1, 1986).

Letter from Nuclear Regulatory Commission to Hatch dated Sep. 30, 1994, Thirteen Pages.

Hatch submittal to Nuclear Regulatory Commission dated Sep. 2, 1994, Nineteen Pages.

Illustration of Indian Point Unit 2, Figs. 2–1, 2–9, 3.2–47 and 3.2–51, Six Pages.

Illustrations of Maine Yankee Atomic Power Station, Fig. 3.3–1, One Page.

U.S. Nuclear Regulatory Commission, "Millstone Final Safety Analysis Report," Aug. 10, 1972, 54 Pages.

Handouts from NRC Meeting with Hatch/GE on Sep. 14, 1994, 211 Pages.

Illustration of Palo Verde Reactor Vertical Arrangement, Fig. 4.4–1, Mar. 1991, One Page.

Illustration of R. E. Ginna Rector Vessel Internals, Fig. 3.9–9 and 3.9–10, Two pages.

Florida Power & Light Company, "Final Safety Analysis Report—vol. 1, St. Lucie Plant," Feb. 28, 1972, Eighty–Four Pages.

Illustration from Shearon Harris Nuclear Power Plant, Carolina Power & Light Company, Final Safety Analysis Report, Fig. 3.92–1, Two Pages.

Yankee Atomic Electric Company, Yankee Rowe Proposal, Oct. 15, 1965, Twenty–Five Pages.

Handouts from NRC meeting with Hatch/GE on Sep. 14, 1994.

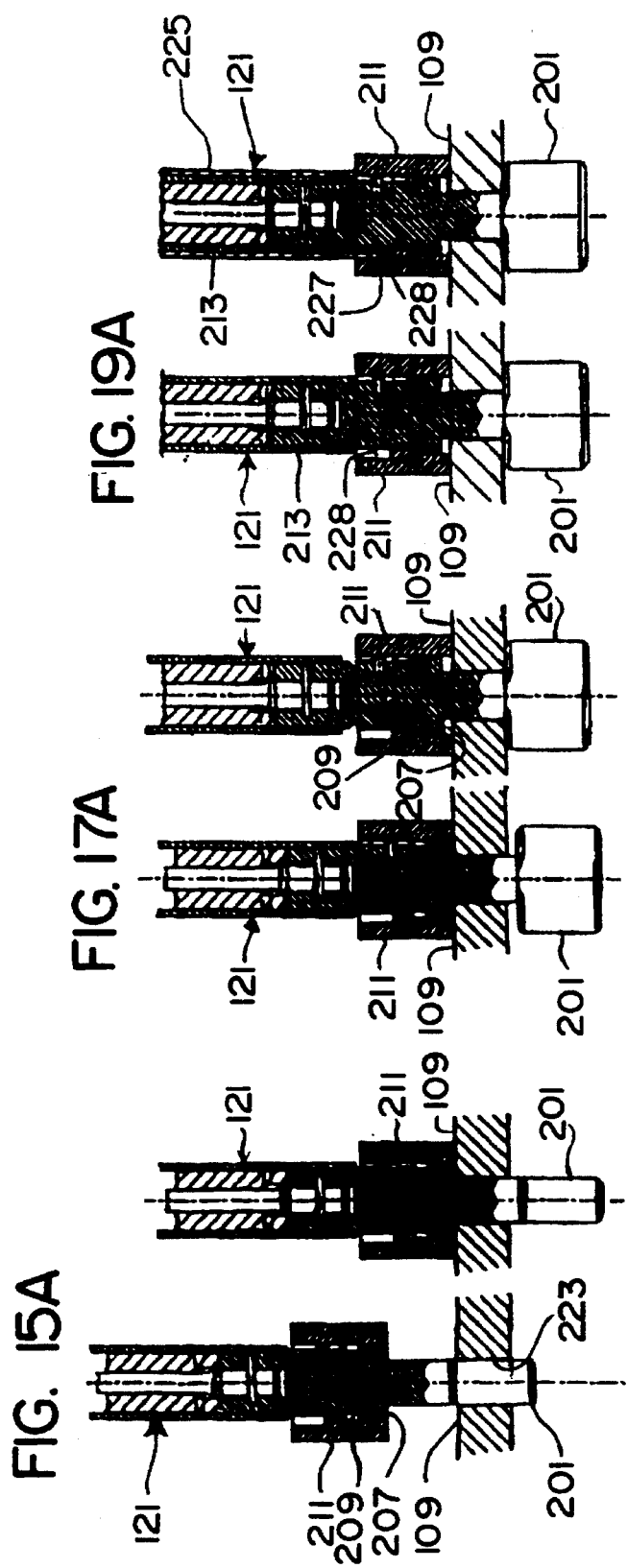

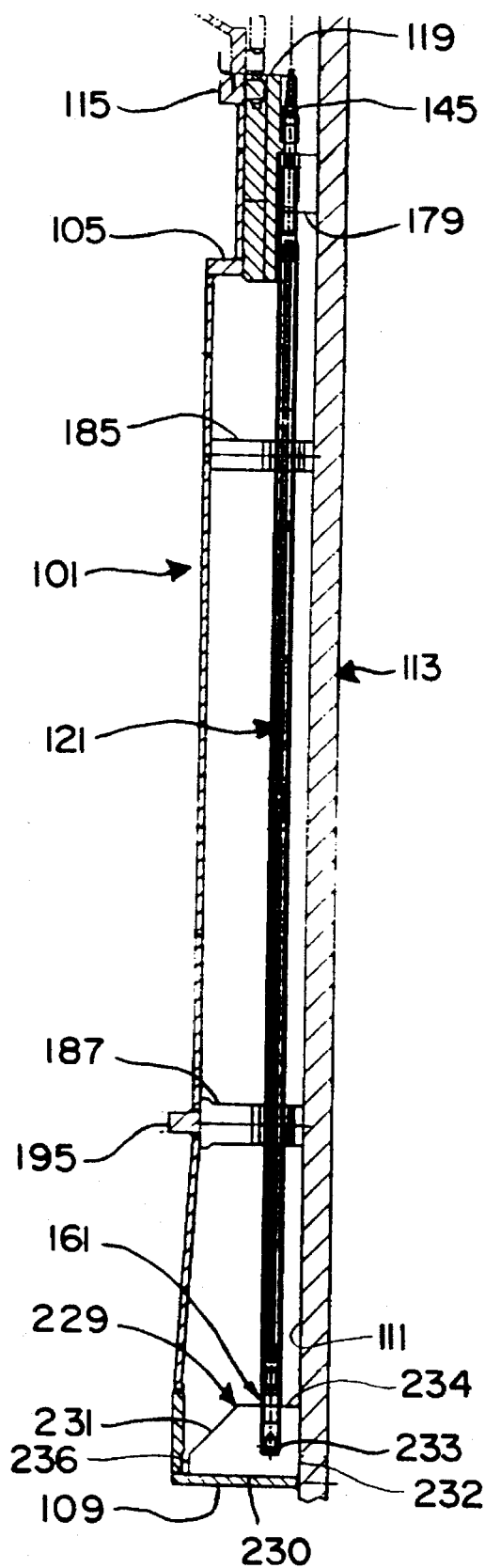
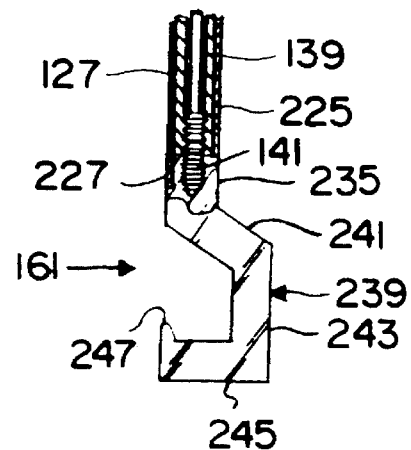
FIG. 23
FIG. 22

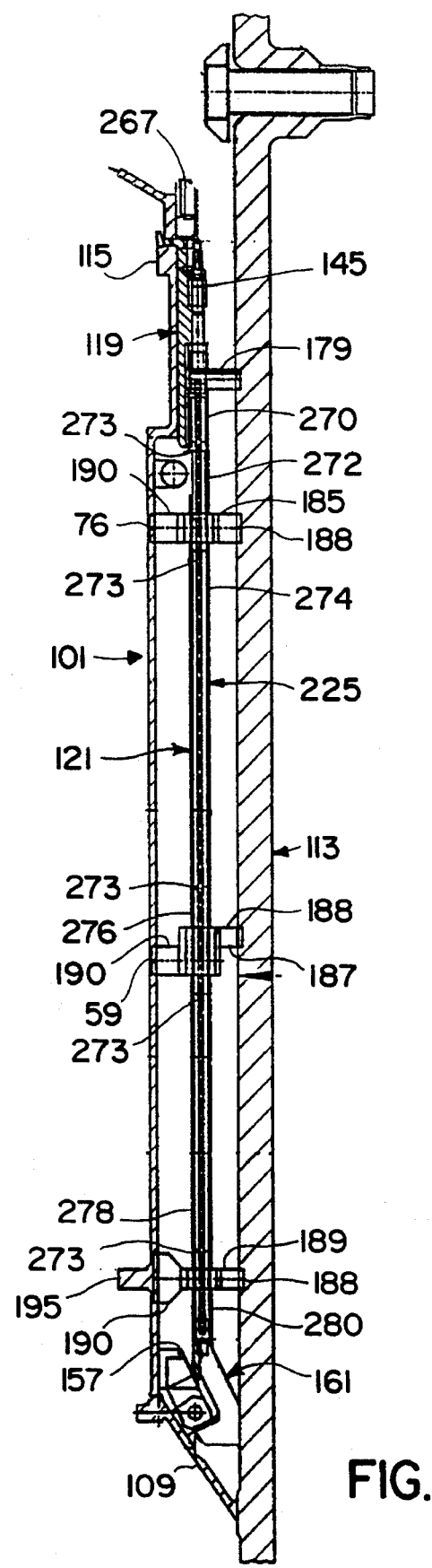
FIG. 29
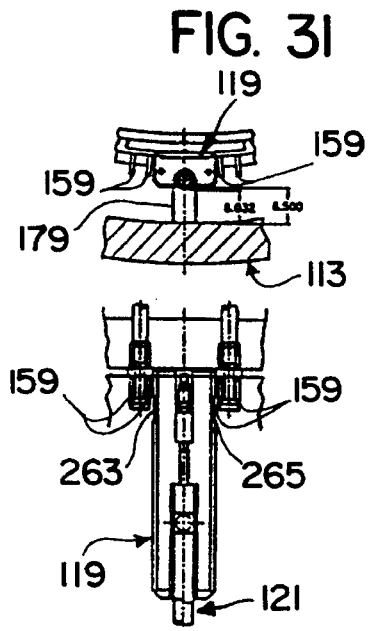
FIG. 31
FIG. 30

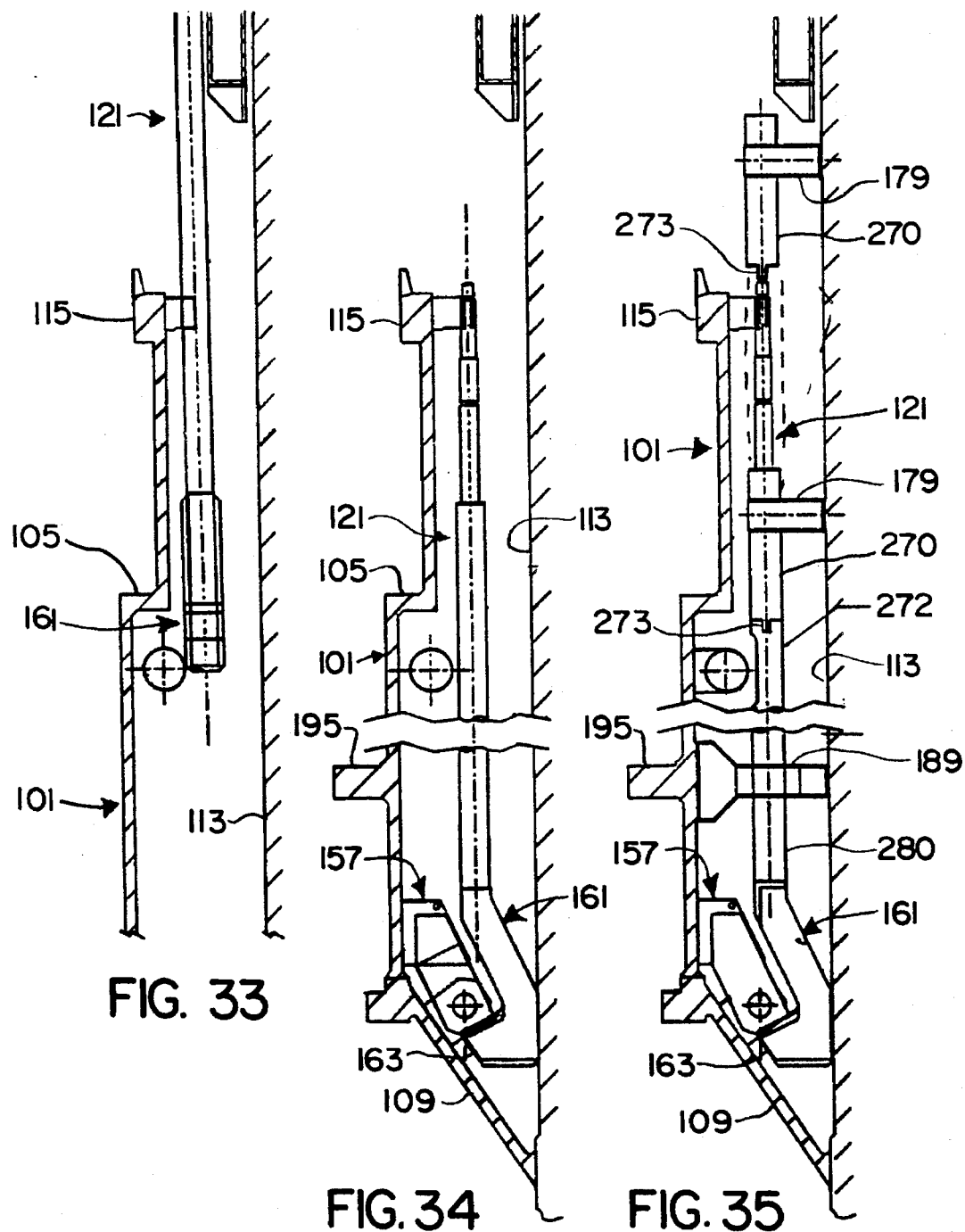

METHOD AND APPARATUS FOR REPAIRING BOILING WATER REACTOR SHROUDS UTILIZING TIE-RODS WITH MULTIPLE LONGITUDINAL MEMBERS

CROSS-REFERENCE TO RELATED APPLICATIONS

This application is a continuation-in-part of patent applications Ser. No. 08/190,796, filed Feb. 2, 1994, now U.S. Pat. No. 5,402,570, and Ser. No. 08/329,409, filed Oct. 27, 1994, now abandoned, the disclosures of which are incorporated herein by reference.

BACKGROUND OF THE INVENTION

1. Technical Field

The present invention relates to a method and apparatus for repairing nuclear reactor core shrouds. In particular, the method and apparatus of the present invention are concerned with repair of boiling water reactor shrouds in order to allow safe reactor operation even with extensive cracking along heat affected zones of horizontal welds.

2. Discussion of the Prior Art

Boiling water reactor shrouds are disposed concentrically within reactor vessels to divide the flow of coolant water through the reactor vessels and to structurally support and align the fuel assemblies, steam separator assemblies and control rod guide tubes. The shrouds are generally cylindrical and are commonly formed from multiple arcuate steel plates having a thickness on the order of one and one-half inches. Plates at each horizontal level of the shroud are joined by welds along abutting, relatively short, vertical edges to encircle the reactor at that level. The plates at different adjacent levels are joined along their abutting, relatively long, arcuate edges with horizontal welds. After periods of use, cracking of the shroud tends to occur within heat affected zones of the welds as a result of corrosion, radiation and stress. Cracking of the vertically oriented welds is considered acceptable because these welds are relatively short in length, relative to the overall shroud length, and do not adversely affect the function of the shroud (i.e., support and alignment of the nuclear fuel assemblies, and channeling of reactor coolant flow). Specifically, vertical welds at adjacent levels are offset angularly about the shroud periphery so that cracking of such a weld can extend, at most, only the axial or vertical length of that level. However, if cracking occurs along the longer horizontal or circumferential welds, a crack can extend along the entire circumference or periphery of the shroud, permitting relative lateral movement between the plate levels. Such excessive cracking, therefore, could prevent the core from supporting and aligning the fuel assemblies, can improperly direct or impede coolant flow, and can permit coolant flow leakage.

When excessive horizontal weld cracking occurs, the shroud must either be replaced or repaired. Repair is certainly the preferred alternative in view of the fact that replacement involves significant expense, relatively long shut down time, and the potential for radiation exposure to personnel. Repair techniques typically involve bolting brackets onto vertically adjacent plates across a weld crack. This approach requires plural brackets for each crack, depending upon the length of the crack. Moreover, welds must be separately inspected after repair for additional cracking of the repaired welds as well as for new cracks in other welds.

A superior method for repairing in situ nuclear reactor shrouds of the type having multiple levels of arcuate plates welded together is disclosed in related copending patent application Ser. No. 08/190,796. The method involves inspecting the shroud for horizontal cracking along welds and securing plural tie-rods in vertical orientation spaced about the periphery of the cracked shroud to axially compress the shroud and thereby urge the opposing surfaces of the horizontal crack toward one another. The repair method is relatively inexpensive, permits safe reactor operation even with excessive cracking of horizontal welds and does not significantly impede coolant flow in the annular space between the shroud and the vessel.

OBJECTS AND SUMMARY OF THE INVENTION

It is a primary object of the present invention to utilize coaxial longitudinal members separated by a small radial gap as tie-rods in the aforementioned nuclear reactor shroud repair method to avoid excessive vibration of the tie-rods caused by flow of the reactor coolant and to avoid excessive loading of the shroud caused by thermal transients in the flow.

It is also an object of the present invention to improve the damping coefficient of such tie-rods by filling the small radial gap between coaxial longitudinal members of the tie-rods with a suitable damping fluid, such as reactor coolant.

A further object of the present invention is to minimize the effects of thermal transients on the shroud by utilizing tie-rods having coaxial longitudinal members with one of the coaxial longitudinal members applying a preload to the shroud and transmitting axial loads to another coaxial longitudinal member only after axially extending a predetermined distance.

It is yet another object of the present invention to assure control rod insertion and to reduce the preload applied by tie-rods secured in vertical orientation about the periphery of a shroud by carrying a plurality of radial spacers at longitudinally spaced locations along the length of the tie-rods.

In accordance with the present invention, a method for repairing a nuclear reactor shroud having at least one horizontally extending weld joining adjacent shroud plate segments involves securing plural tie-rods having coaxial longitudinal members separated by a radial gap in vertical orientation at a respective plurality of angularly spaced locations around the periphery of the shroud to axially compress the shroud thereby preventing the formation of horizontal cracks along the heat affected zones of the weld and/or urging opposed surfaces of existing horizontal cracks toward one another. One of the longitudinal members can be attached to top and bottom portions of the shroud for applying a preload to the shroud and can be coupled with another coaxially disposed longitudinal member in a manner to transmit axial loads from the first longitudinal member to the other coaxially disposed longitudinal member after the first longitudinal member has elastically extended a predetermined axial distance. The method can also include positioning a plurality of radial spacers at longitudinally spaced locations along the length of a tie-rod to assure control rod insertion by limiting lateral movement of the shroud and to reduce the preload required for preventing the formation of new cracks and stabilizing existing cracks.

Another aspect of the present invention is generally characterized in a boiling water reactor shroud assembly including a shroud and a plurality of tie-rods secured to sites on the shroud adjacent top and bottom portions of the shroud at a respective plurality of angularly spaced locations around the shroud periphery. Each tie-rod includes a plurality of coaxial longitudinal members separated by a radial gap filled with damping fluid. One of the longitudinal members can be attached to top and bottom portions of the shroud for applying a preload to the shroud and can be coupled with another coaxially disposed longitudinal member in a manner to transmit axial loads from the first longitudinal member to the other coaxially disposed longitudinal member after the first longitudinal member has axially extended a predetermined distance. A plurality of radial spacers can also be positioned at longitudinally spaced locations along the length of a tie-rod to assure control rod insertion by limiting lateral movement of the shroud and to reduce the preload required for preventing the formation of new cracks and stabilizing existing cracks.

Yet another aspect of the present invention is generally characterized in a tie-rod for applying a compressive force to a boiling water reactor shroud and includes a plurality of coaxial longitudinal members separated by a radial gap filled with damping fluid. The tie-rod includes means for securing opposite ends of one of the coaxial longitudinal members to sites on the shroud adjacent top and bottom portions of the shroud and for coupling at least one other coaxial longitudinal member with the first member in a manner to be axially loaded after the first longitudinal member has axially extended a predetermined distance. A plurality of radial spacers can also be positioned at longitudinally spaced locations along the length of the tie-rod to assure control rod insertion by limiting lateral movement of the shroud and to reduce the preload required for preventing the formation of new cracks and stabilizing existing cracks.

The foregoing and other objects, features and many of the attendant advantages of the present invention will be appreciated more readily as they become better understood from reading the following description considered in connection with the accompanying drawings wherein like parts in each of the several figures are identified by the same reference characters.

BRIEF DESCRIPTION OF THE DRAWINGS

FIGS. 15A–20A and 15B–20B are enlarged side views, partly in section, and bottom views, respectively, illustrating installation of the tie-rod assembly of FIG. 9.

FIG. 22 is a side view, partly in section, of the shroud assembly of FIG. 21.

FIG. 23 is a side view, partly in section, of the lower end of the tie-rod assembly shown in FIG. 21.

FIG. 29 is a side view, partly in section, of the reactor shroud assembly of FIG. 27.

FIG. 30 is a front view of the tie-rod assembly of FIG. 27.

FIG. 31 is a top view of the tie-rod assembly of FIG. 27.

FIGS. 33–37 are side views, partly in section, illustrating installation of the tie-rod assembly of FIG. 27.

DESCRIPTION OF THE PREFERRED EMBODIMENTS

The method and apparatus of the present invention are described hereinafter for use in repairing boiling water reactor shrouds of the type having horizontally extending welds joining adjacent shroud plate segments; and, while the method and apparatus of the present invention can be used to restore the structural integrity of shrouds having horizontal cracks extending along the heat affected zones of horizontal welds, the term "repair" as used herein is also meant to include use of the invention for preventing the formation of new cracks as well. For example, in the case of uncracked shrouds which are nevertheless susceptible to cracking along horizontal welds, the method and apparatus of the present invention can be used prior to, during or after installation of the shrouds to prevent the development of cracks after the reactors have become operational; or, when used to restore an already operational reactor, the method and apparatus of the present invention can stabilize existing cracks and prevent the development of new cracks, allowing continued safe operation and maintenance of the reactor.

Figure 1:
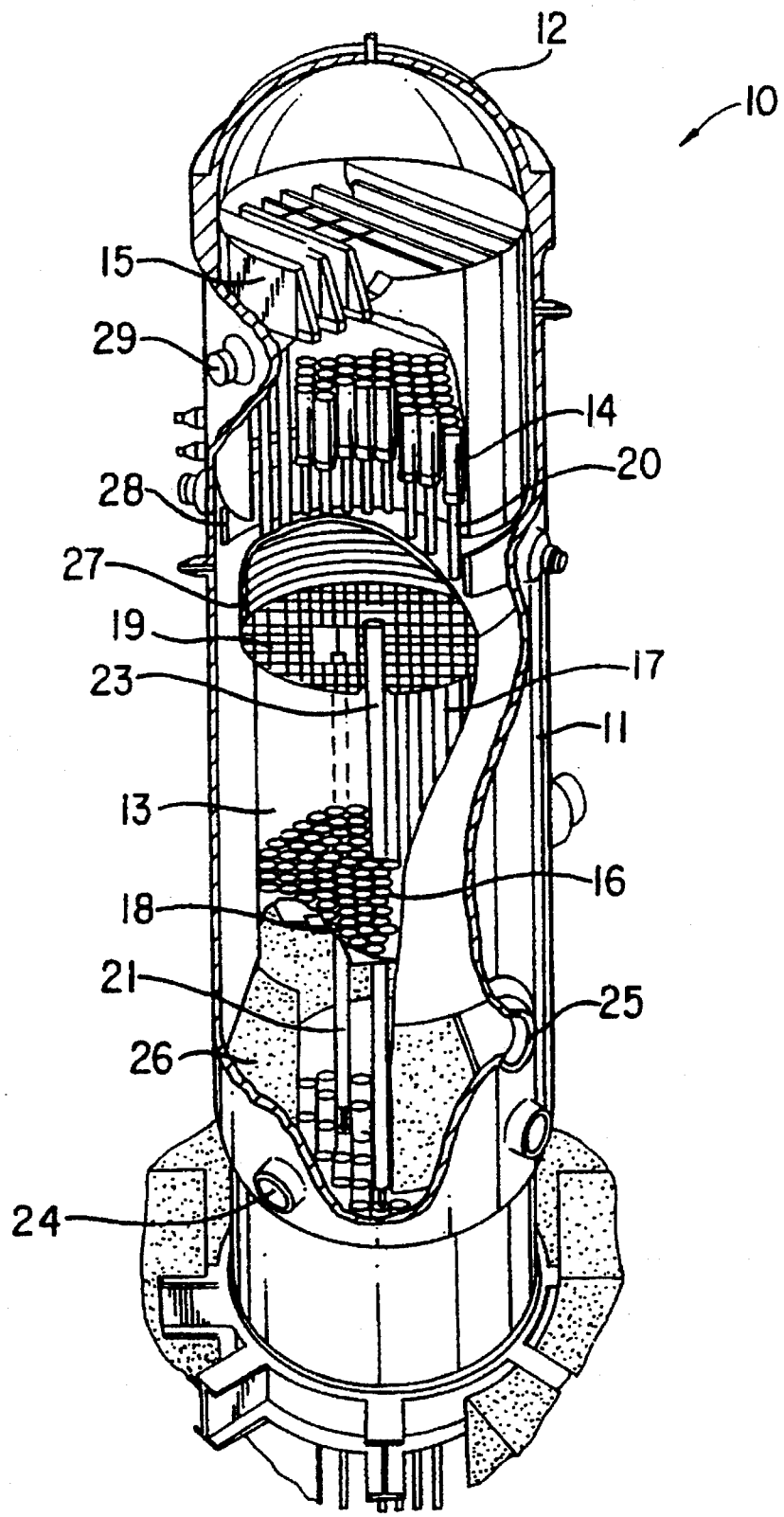
FIG. 1 is a cut-away view in perspective of a boiling water reactor exemplifying a type of reactor suitable for repair by the method of the present invention.

In order to provide a point of reference for understanding the method and apparatus of the present invention, a boiling water nuclear reactor assembly 10 is illustrated in cut-away in FIG. 1. In view of the fact that the invention relates primarily to improvements in the reactor shroud and not to the reactor itself, no attempt is made herein to provide a detailed description of reactor operation. Such operation is adequately described in numerous publications and patents, for example U.S. Pat. Nos. 3,627,634 (Guenther et al) and 4,789,520 (Morimoto et al), among others.

Reactor assembly 10 includes a pressure vessel 11 tightly sealed by a lid 12 at the vessel top. Reactor core shroud 13 is mounted inside vessel 11. A steam separator 14 is mounted on a steam plenum head 20 on top of the shroud 13, and a steam drying assembly 15 is disposed above the steam separator. A lower reactor core support plate 16 disposed within shroud 13 supports a fuel assembly 17, also disposed within the shroud. Lower core grid 18 and upper core grid 19 are positioned below and above, respectively fuel assembly 17.

Control rod guide tubes 21 are provided within vessel 11 at locations above a control rod driving mechanism (not shown) located at the bottom of the vessel beneath shroud 13. The lower ends of corresponding control rods 23 are detachably connected to the driving mechanism and are arranged to move up and down within guide tubes 21.

Recirculated water is delivered into vessel 11 via one or more inlet ports 24, and egresses via one or more outlet ports 25. Also illustrated is a diffuser 26, a core sparger 27 and a feed water sparger 28. One or more steam outlets 29 communicates between the interior and exterior of vessel 11 at a location above the shroud and the steam separator.

Shroud 13 is typically made up of multiple levels, each comprising plural arcuate Type 304 steel plates having a thickness on the order of one and one-half inches and welded together at their abutting edges. To better understand this welded structure, reference is now made to FIG. 2 wherein the plates are shown in flattened projection adjacent a 360° scale provided for angular orientation reference. The plates are oriented with their long or arcuate dimensions disposed horizontally, their width dimensions disposed vertically and their thickness dimensions disposed radially or into the plane of the drawing in FIG. 2.

Figure 2:
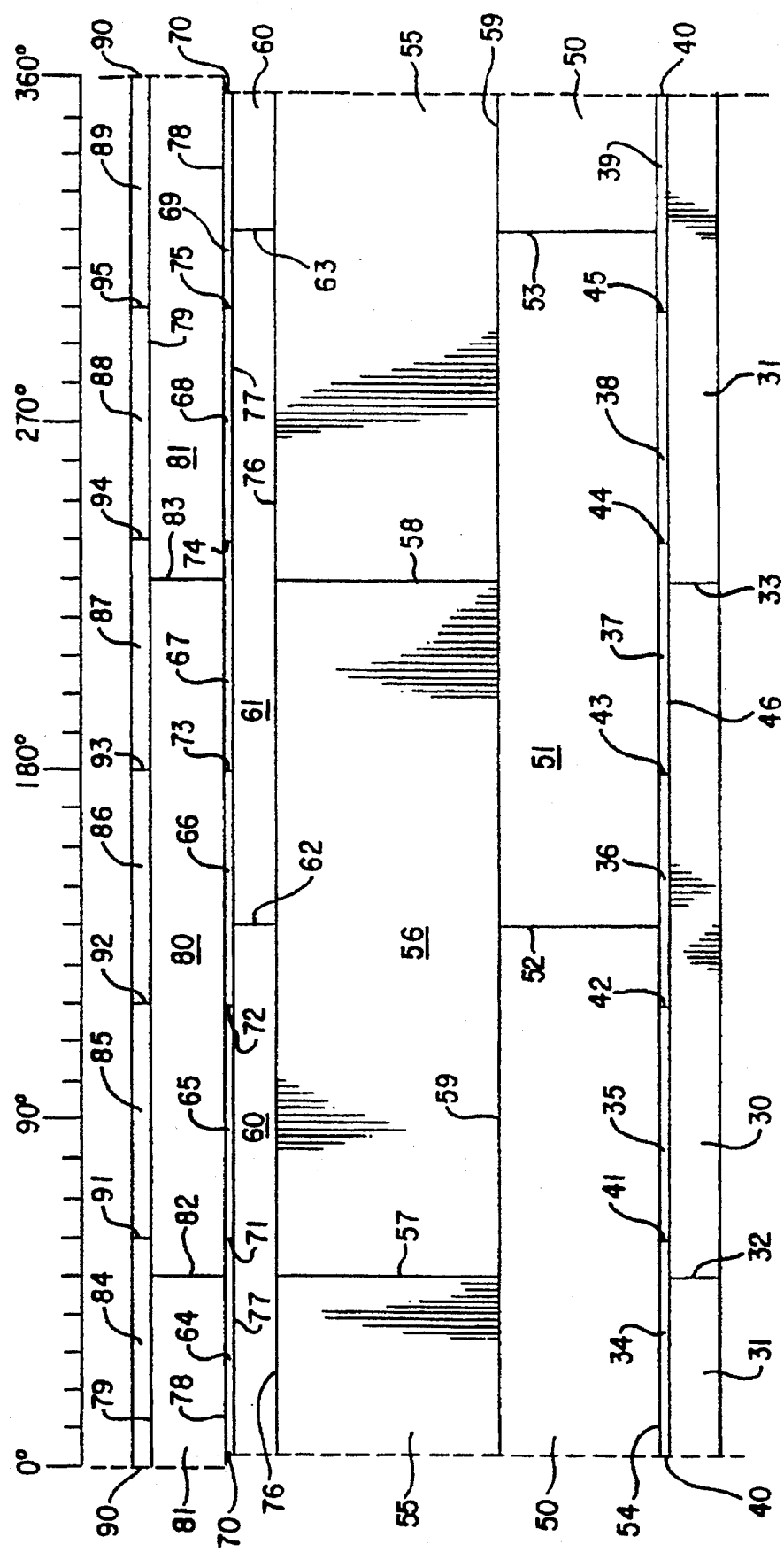
FIG. 2 is a flattened projection of a cylindrical core shroud in the reactor of FIG. 1.

The particular shroud illustrated in FIG. 2 includes eight horizontal annular levels of plates, the plates at any level being of the same width (or height), with the height varying from level to level. The thickness or depth of the plates is the same for every level. As illustrated, the bottom annular level is made up of two plates 30, 31, each 180° in circumferential length, disposed end to end and welded together at their abutting ends to form vertical welds 32 and 33. The second level from the bottom is made up of six plates, 34, 35, 36, 37, 38 and 39, each 60° in circumferential length, also welded together at abutting ends to form vertical welds 40, 41, 42, 43, 44 and 45. The bottom edges of plates 34 through 39 are welded to the abutting top edges of plates 30, 31 to provide a circumferentially continuous horizontal weld 46. The vertical welds 32 and 33 between plates 30 and 31 are angularly offset from vertical welds 40 through 45 so that vertical welds in adjacent levels are not in angular or longitudinal alignment. It is also noted that the plates 34 through 39 in the second level are significantly narrower (i.e., smaller in vertical height) than plates 30, 31 in the bottom level.

The third lowest level includes two 180° plates 50, 51 disposed end to end and welded together at their abutting ends to form vertical welds 52, 53. The bottom edges of plates 50, 51 are welded to the top edges of plates 34 through 39 to provide a circumferentially continuous horizontal weld 54. Vertical welds 52, 53 are angularly offset from vertical welds 40 through 45 and from welds 32, 33. Plates 50, 51 are wider (i.e., larger in the vertical dimension) than plates 30, 31 and plates 34 through 40.

The fourth annular level of shroud plates includes two 180° plates 55, 56 having their ends welded together at welds 57, 58. Vertical welds 57, 58 are angularly offset from vertical welds 52, 53 and from welds 40 through 45; however, welds 57, 58 are vertically aligned with welds 32, 33, respectively. Plates 57, 58 are wider than the plates in all other levels of the shroud. The bottom edges of plates 55, 56 are welded to the top edges of plates 50, 51 to form a circumferentially continuous horizontal weld 59.

In a like manner, successively higher annular levels of the shroud include two 180° plates 60, 61 at level five, six 60° plates 64, 65, 66, 67, 68, 69 at level six, two 180° plates 80, 81 at level seven, and six 60° plates 84, 85, 86, 87, 88, 89 at level eight. Level five has vertical welds 62, 63; level six has vertical welds 70, 71, 72, 73, 74 and 75; level seven has vertical welds 82, 83; and level eight has vertical welds 90, 91, 92, 93, 94, 95. Circumferentially continuous horizontal welds 76, 77, 78 and 79 are provided between levels four and five, levels five and six, levels six and seven and levels seven and eight, respectively. The widths or heights of level five, six, seven and eight are all different, each being smaller than the widths of levels three and four.

No vertical welds in any shroud level are aligned with vertical welds in an adjacent shroud level. Accordingly, a crack in a heat affected zone of any vertical weld cannot extend beyond one shroud level, and such cracks are typically ignored. On the other hand, horizontal welds 46, 54, 59, 76, 77, 78 and 79 are circumferentially continuous. A crack in the heat affected zone in one of these horizontal welds, therefore, could ultimately extend about the entire circumference of the shroud. It will be appreciated that circumferential cracks could result in significant relative horizontal movement between shroud levels in response to seismic events and other vibrations. This would adversely affect the support and alignment of nuclear fuel assemblies disposed within the shroud. Likewise, coolant flow through the reactor would be adversely affected.

In accordance with the present invention, tie-rods are installed on the shroud in situ before the reactor is operational or after an already operational reactor is shut down. Installation of the tie-rods uses existing structure in the reactor whenever possible but may require additional hardware. The tie-rods are spaced about the shroud periphery in the annular space between the shroud and the reactor vessel.

The features of the shroud assembly are typically the same at a plurality of angularly spaced locations about the shroud periphery where the tie-rods are installed. Accordingly, the shroud assembly will hereinafter be described with reference to a single angular location for purposes of clarity.

Figure 3:
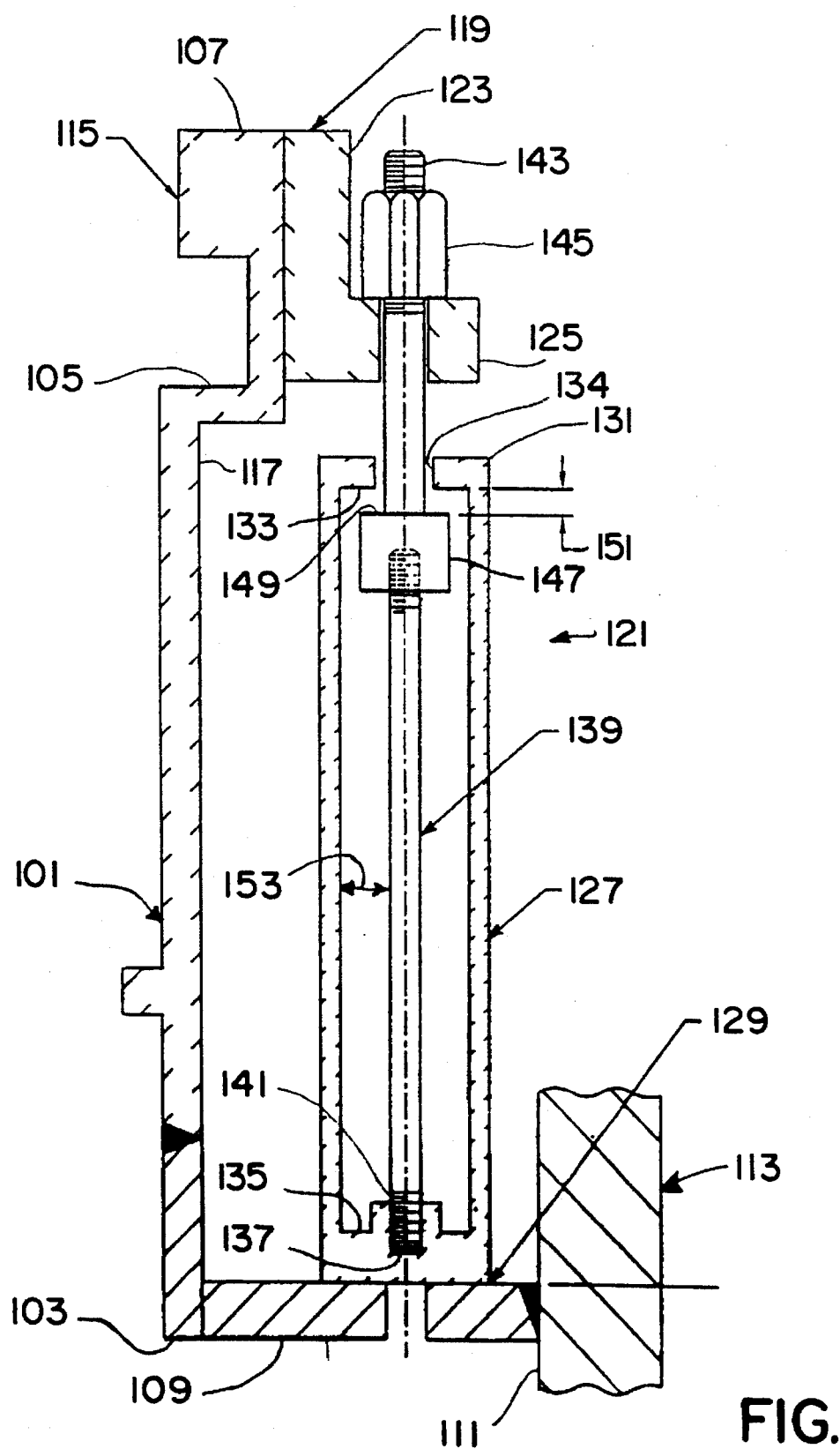
FIG. 3 is a schematic view, partly in section, of a portion of a reactor shroud repaired using a tie-rod assembly according to the present invention.

A boiling water reactor shroud assembly according to the present invention is shown schematically in FIG. 3. Shroud 101 is generally cylindrical and extends vertically from a bottom edge 103 to a transverse dimensional transition or step 105 where the shroud increases in diameter. The increased diameter portion of the shroud extends vertically from step 105 to a top edge 107. A horizontal support plate 109 in the form of a ring is connected between the bottom edge of the shroud and an inner surface 111 of the reactor vessel 113 to serve as a support for the shroud. An annular rim or flange 115 extends radially inward along the top edge of the shroud to form a mounting surface for attaching a sealing lid (not shown) to the shroud by means of bolts threadedly engaging the flange or lugs angularly spaced about the shroud periphery and carried on an external surface 117 of the shroud adjacent the shroud flange. The structure thus far described is part of the original reactor assembly and is not added as part of the present invention.

At each location where a tie-rod is to be installed, a bracket or beam 119 is affixed to the upper edge of the shroud and configured to receive a top end of a tie-rod 121. Each bracket 119 is generally L-shaped and includes a vertical leg 123 affixed to the exterior surface of the shroud by bolts threadedly engaging the shroud flange 115 and a horizontal leg 125 extending radially outward from the shroud and having a through-hole formed therein for passage of the tie-rod 121.

Tie-rod 121 extends between the ring-like support plate 109 at the bottom of the shroud and the tie-rod bracket 119 attached near the top of the shroud. The tie-rod 121 includes a tubular longitudinal member 127 in the form of a pipe section extending vertically from a bottom end 129 secured to the horizontal shroud support plate 109 to a top end 131 axially spaced below the horizontal leg 125 of the tie-rod bracket 119. The top end 131 of the pipe section 127 is partially closed by an annular rim or flange 133 defining a central opening 134 therethrough. The bottom end 129 of the pipe section is closed at 135 and defines a threaded receptacle 137 in axial alignment with the opening 134 defined by the upper flange 133 of the pipe section 127. A second longitudinal member 139 in the form of a spring rod is concentrically disposed within the pipe section 127 and includes a bottom end 141 threadedly engaging the closed end 135 of pipe section 127 and a top end 143 extending vertically upward through the opening 134 at the top end of the pipe section 127 and the hole in the tie-rod bracket 119 to be threadedly engaged by a nut 145. Nut 145 is selectively tightened against the horizontal leg 125 of the tie-rod bracket to tension the spring rod 139 axially a suitable amount to compress the horizontal shroud levels together.

The spring rod 139 carries an increased diameter portion or outwardly extending flange 147 forming an abutment surface 149 axially spaced below the annular rim or flange 133 of the pipe section for defining an axial gap 151 therebetween. The spring rod and pipe section diameters are chosen to provide a radial gap 153 therebetween to accommodate reactor coolant flowing through the opening defined between the spring rod 139 and the annular rim or flange 133 of the pipe section.

The tie-rods serve two primary functions. First, the tie-rods axially compress the horizontal shroud levels together, even for a worst case horizontal crack extending a full 360° about the circumference of the shroud. The design basis vertical load capability of the tie-rods for this purpose is on the order of 1.5 to 2.0 million pounds, depending upon the actual reactor being repaired. Second, the tie-rods prevent lateral shear deflection between shroud levels which could otherwise be free to move laterally due to a 360° circumferential crack fully through the shroud wall thickness. The prevention of lateral shear is effected by compressing the opposite surfaces of the horizontal cracks against one another. The design basis lateral load due to seismic events is approximately 400,000 pounds, depending upon the reactor.

In a typical tie-rod installation, fluctuating forces up to about 15 pounds can be developed as a consequence of reactor coolant flowing past the tie-rods. Depending on the vibration damping coefficient value of the tie-rods, such forces can induce excessive vibration and failure of the tie-rods due to fatigue and/or wear at points of attachment.

By installing tie-rods composed of multiple coaxial longitudinal members separated by a small radial gap filled with reactor coolant, the present invention mitigates the effects of fluctuating forces caused by reactor coolant flowing past the tie-rods. A typical value for the vibration damping coefficient of a single member (i.e., solid) tie-rod is about 0.5% of critical. Hence, if a single member tie-rod is loaded by a 15 pound force fluctuating in phase and at the natural frequency of the tie-rod, stresses of about ±22,000 psi and tie-rod deflections of about ±0.1 inches can result. Such stresses are equivalent to about a 15,000 pound force being applied to each tie-rod.

The coaxial longitudinal members utilized in the present invention are closely spaced so that any significant lateral vibration will result in displacement of the reactor coolant filling the radial gap between members, frictional contact between the members, a tendency for various members to vibrate at different frequencies, or any combination of the above effects. As a result, the tie-rods of the present invention can have a vibration damping coefficient in excess of 5% and experience about one-tenth of the stresses and deflections of a single member tie-rod (i.e., low fluctuating stresses of about ±2200 psi and vibration amplitudes of about ±0.01 inches).

Since one of the mechanisms for increasing the vibration damping coefficient involves impact and/or frictional engagement between concentric members, anticipated areas of contact between the members are preferably configured in a manner to prevent excessive wear or other damage, for example by increasing the amount of material at affected locations.

As stated previously, the main purpose for installing tie-rods is to hold the shroud together in the case of cracking along horizontal welds. To this end the tie-rods are secured between top and bottom portions of the shroud, and it will be appreciated that differences in axial expansion and contraction of the shroud and tie-rods can result in significant loading of both structures. Specifically, certain reactor thermal transients can result in large temperature differences between the tie-rods and the shroud causing the tie-rods to contract relative to the shroud.

For example, a 260° F. reactor coolant temperature difference can result in a metal temperature difference up to about 130° F. and increase stresses on the shroud and its support plate by as much as about 110,000 psi if the cross-sectional area of the tie-rod is sufficiently large to withstand all design basis loads (including those resulting from accidental conditions such as a steam line brake or a recirculating line brake, etc.).

The tie-rod of the present invention avoids problems associated with large thermal transients by use of a longitudinal spring member of relatively small cross-sectional area sufficient to hold the cracked shroud together under nominal loading conditions while exerting minimal loads on the shroud in response to large thermal transients in the coolant flow. At the same time, accident loading conditions are accommodated by coupling the longitudinal spring member with a coaxial longitudinal stiffening member configured to be loaded axially only upon the occurrence of an accident condition causing the longitudinal spring member to extend beyond a predetermined axial gap.

Figure 4:
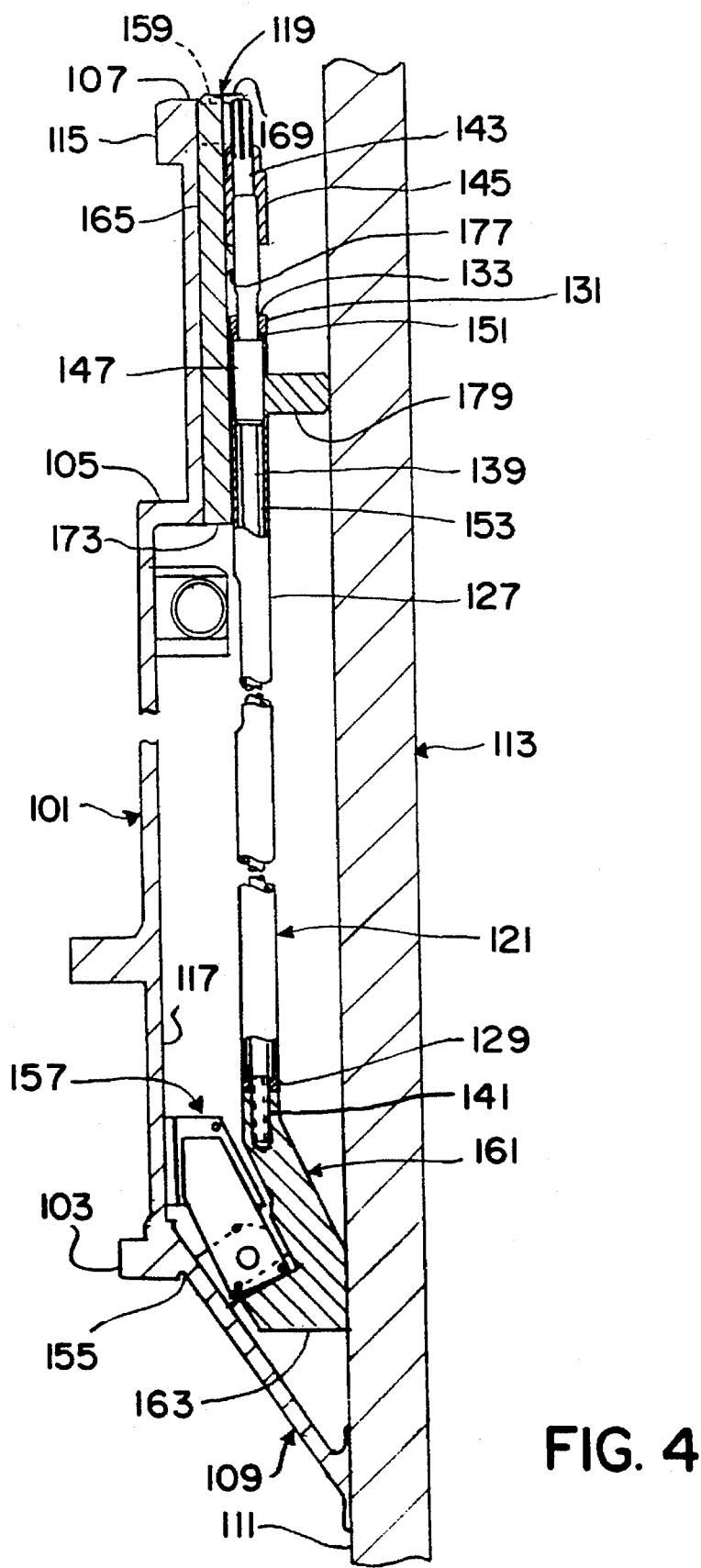
FIG. 4 is a broken side view, partly in section, of a portion of a reactor shroud repaired using a tie-rod assembly according to the present invention.
Figure 5:
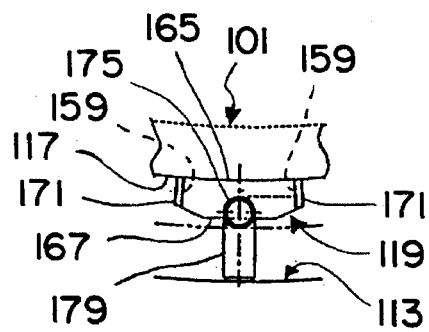
FIG. 5 is a top view of the tie-rod assembly of FIG. 4.
Figure 6:
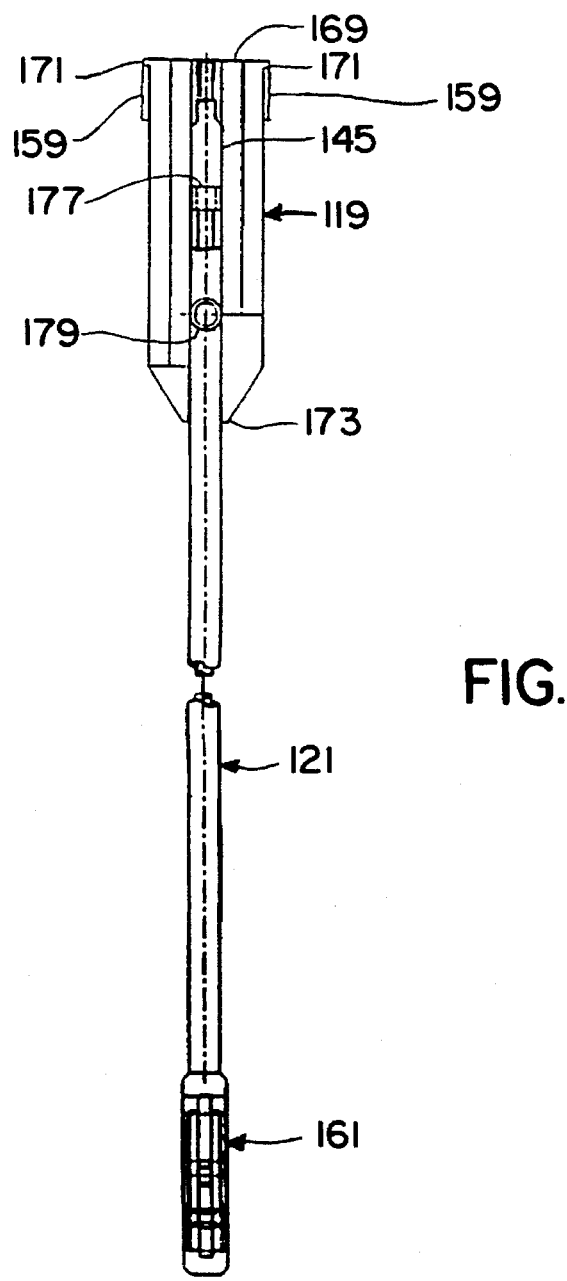
FIG. 6 is a front view in broken elevation of the tie-rod assembly of FIG. 4.

A particular boiling water reactor shroud assembly is shown in FIGS. 4, 5 and 6 to illustrate an exemplar tie-rod repair installation. Referring to FIGS. 4, 5 and 6, a generally cylindrical shroud 101 has a frusto-conical support plate 109 diverging from the bottom annular edge 103 of the shroud to abut the interior surface 111 of the reactor vessel 113. Support plate 109 is welded to the vessel wall at the annular abutment location. The upper edge 155 of the support plate may be formed integrally with or welded to the bottom annular edge 103 of shroud 101. A plurality of brackets 157 are secured by welding or any other suitable method to the outside surface 117 of the shroud cylinder 101 near the bottom annular edge 103 of the shroud and to support plate 109 near the upper edge 155 of the support plate to provide additional strength for the junction of the support plate and the shroud. Brackets 157 are spaced at regular angular intervals about the periphery of shroud 101. As shown, the lowermost part of bracket 157, extending perpendicularly from the support structure 109, is radially spaced from the interior surface 111 of vessel 113. The shroud sealing lid (not shown) is secured to the upper annular edge 107 of shroud 101 by means of bolts threadedly or otherwise engaged by outwardly extending lugs 159 secured in angularly spaced relation to the shroud periphery adjacent the upper edge of the shroud. It is to be noted that, for purposes of convenience, the arcuate plates making up the different shroud levels are not individually illustrated in these drawings; it is to be understood, however, that the shroud structure comprises a plurality of horizontal levels of plates of the type described above in relation to FIG. 2.

The tie-rods 121 employed to repair the shroud are engaged by using the existing brackets 157 and lugs 159. Specifically, each tie-rod 121 carries a hook or similar engagement member 161 having a wedge-shaped lower portion 163 configured to engage a bracket 157 from the underside of that bracket to prevent upward axial movement of the tie-rod. It will be appreciated that, for reactors wherein brackets 157 are not provided, suitable holes may be formed in support plate 109 to receive and threadedly (or otherwise) engage the bottoms of tie-rods 121. Under such circumstances, of course, engagement member 161 may not be required or can be configured for being bolted or hooked through a slotted opening in the shroud support structure. Holes for this purpose may be formed by drilling, EDM techniques, etc.

At their upper ends, tie-rods 121 are secured to respective metal beams or brackets 119 installed during the repair procedure atop the existing lugs 159. Each beam 119 includes an arcuate inner surface 165 conforming approximately to the curvature of the outside surface 117 of the shroud, an outer surface 167 facing the reactor vessel 113, a top edge 169 terminating in a pair of oppositely disposed transversely extending tabs 171, and a lower edge 173. A longitudinal channel 175 is formed in the outer surface 167 for accommodating the tie-rod 121, and a semicircular boss 177 is located in the channel intermediate the upper and lower edges of the beam. Each beam 119 is configured to fit between respective pairs of angularly spaced lugs 159 and to be supported therefrom by the transversely extending tabs 171. The beams 119 are secured to the lugs 159 by any suitable means, such as by screws, etc. The boss 177 has an open section facing the vessel 113 and defines an annular ridge within the channel 175 of a beam to receive a tie-rod 121 and to provide a surface against which each tie-rod 121 may be axially tightened using a nut 145 threadedly engaging the upper end of the tie-rod 121 and bearing against the boss 177. When nuts 145 are tightened, engagement members 161 are pulled upward such that their lower portions 163 exert upward forces against brackets 157. Corresponding downward forces are exerted by the nuts 145 on the beams 119 via bosses 177, resulting in axial or longitudinal compression of the entire shroud by the multiple, angularly spaced tie-rods. This longitudinal compression urges the opposing surfaces of horizontal cracks toward one another, thereby sealing the cracks and preventing their adverse effects on the shroud structure. Moreover, horizontal cracking occurring subsequent to the installation of the tie-rods is rendered similarly ineffectual by the axial compression continuously applied by the tie-rods.

As described previously, each tie-rod 121 includes a plurality of concentric longitudinal members. One of the longitudinal members is a spring rod 139 extending between the engagement member 161 and the threaded nut 145 for applying a preload sufficient to hold the shroud together while minimizing the effects of thermal transients resulting in large temperature differences between the tie-rod and the shroud. The spring rod 139 is typically composed of a high strength material, such as XM19, and has a relatively small cross-sectional area of between about 0.7 to about 1 in$^2$ in order to mitigate the effects of such thermal transients which effects are proportional to the cross-sectional area of the tie-rod member involved. A bottom end 141 of the spring rod 139 is threadedly secured to the upper end of the engagement member 161 and the spring rod 139 extends vertically upward therefrom to terminate at an upper end 143 threadedly engaging nut 145. The spring rod 139 also includes an increased diameter portion or outwardly extending flange 147 intermediate its upper and lower ends.

A second longitudinal member in the form of a stiffening pipe section 127 is concentrically disposed around the spring rod 139 and secured at a bottom end 129 to the upper portion of engagement member 161. The pipe section 127 terminates at an upper end 131 in an inwardly extending flange 133 axially spaced above the outwardly extending flange 147 of the spring rod to define an axial gap 151 allowing a predetermined amount of axial extension of the spring rod before the outwardly extending flange 147 of the spring rod engages the inwardly extending flange 133 of the pipe section. A typical axial gap between spring rod and pipe section flanges is about 0.5 inches for a tie-rod in an initially unloaded condition and about 0.35 inches for a tie-rod applying an axially compressive load. Actual axial gaps will of course vary depending on the materials used and the anticipated thermal transients and accident loading conditions.

A small radial gap or clearance 153 is defined between the pipe section 127 and the spring rod 139 and filled with reactor coolant (e.g., water) to achieve improvement in the damping coefficient of the tie-rod. Although the size of the radial gap will vary from one installation to another, a typical separation between the spring rod and pipe section is about 0.5 inches. A radial spacer 179 takes the form of a cylindrical projection extending radially from the pipe section 127 near the upper end of the pipe section and serves as a bumper or stop bearing against the interior surface 111 of reactor vessel 113 when the tie-rod 121 is deployed. The radial spacer 179 restricts lateral movement of the shroud to stabilize the core and assure control rod insertion.

Deployment of the tie-rod assembly of FIGS. 4 through 6 involves lowering the assembly vertically downward between the shroud and reactor vessel in an orientation where it is rotated 90° relative to its final deployment orientation. This permits engagement member 161 and radial spacer 179 to be freely moved longitudinally until the assembly is at its proper vertical position. The assembly is then rotated 90° about the tie-rod axis whereupon the lower portion 163 of engagement member 161 engages the underside of bracket 157, spacer 179 bears radially against the reactor vessel wall, and the upper end of the tie-rod is fitted within the channel defined in beam 119. Nut 145 is then threadedly engaged with the upper portion of the spring rod 139 extending above the boss 177 and tightened a suitable amount for maintaining a desired axial compression.

Figure 7:
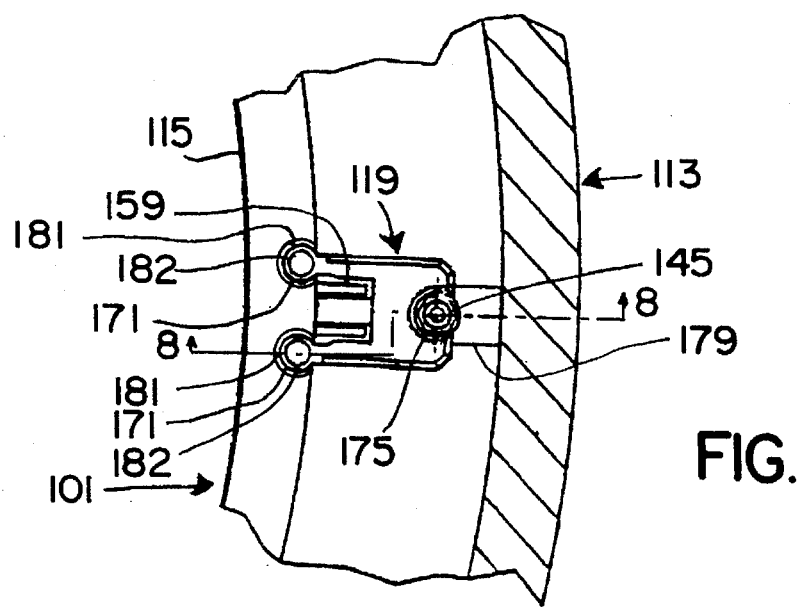
FIG. 7 is a top view of a modified tie-rod assembly according to the present invention.
Figure 8:
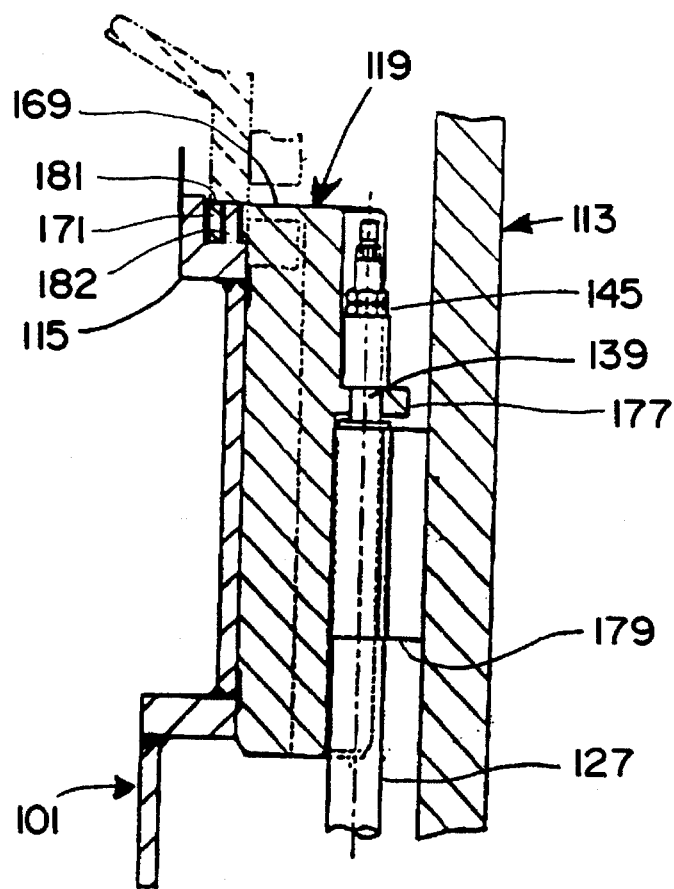
FIG. 8 is a cross-sectional view of the tie-rod assembly of FIG. 7 taken through line 8—8.

A modified shroud assembly is illustrated in FIGS. 7 and 8 wherein the tie-rod attachment beam or bracket 119 includes a pair of hollow cylindrical tabs 171 extending downward from angularly spaced locations along a top edge 169 of the beam to fit within annular grooves or recesses 181 formed in the shroud flange 115. The modified tie-rod attachment beam 119 also includes a horizontal boss 177 with a through-hole defined therein for passage of the spring rod 139. Installation of the tie-rods 121 using the modified beam 119 is essentially the same as previously described with the exception that pairs of annular grooves or recesses 181 are formed in the shroud flange 115 at circumferentially spaced locations on opposite sides of an existing pair of lugs 159, as best seen in FIG. 7. A vertical post or peg 182 is disposed at the center of each annular groove 181 and is configured to fit within a cylindrical beam tab 171 when the cylindrical beam tab is placed into one of the annular grooves 181 in order to suspend the bracket 119 from the upper shroud flange 115.

The modified shroud assembly shown in FIGS. 9–14 is similar to those previously described but includes a generally L-shaped bracket or brace 183 mounted on the external surface 117 of the shroud 101 proximate the horizontal step 105, a shortened beam 119 providing clearance for the brace 183 and a tie-rod 121 with a modified engagement member 161. In addition, a plurality of radial spacers 185, 187 and 189 extend between the external surface of the shroud 101 and the inner surface of the reactor vessel 113 at spaced locations along the length of the tie-rod 121.

Figure 10:
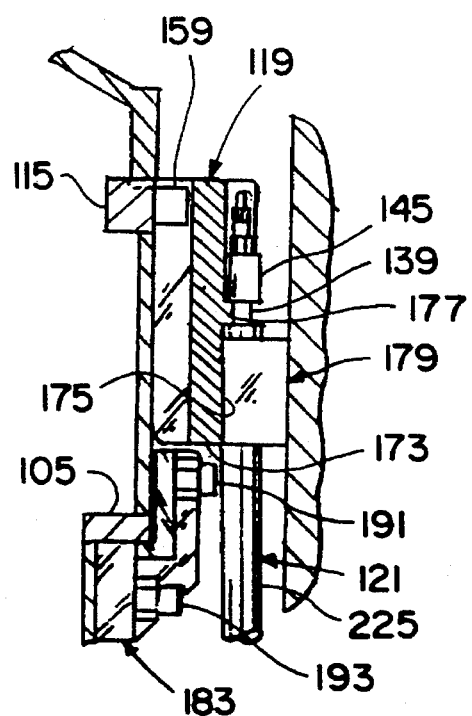
FIG. 10 is an enlarged fragmentary side view, partly in section, of the tie-rod assembly of FIG. 9.
Figure 11:
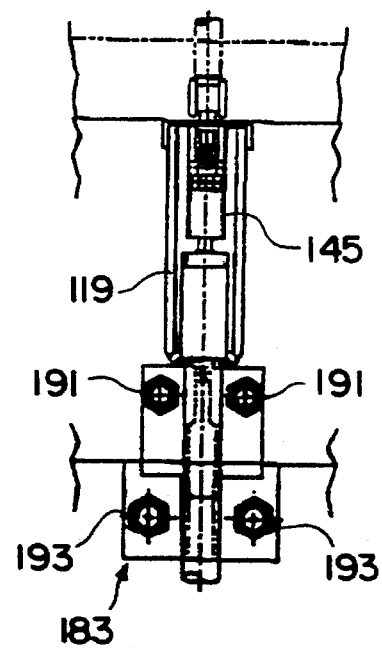
FIG. 11 is a fragmentary front view of the tie-rod assembly of FIG. 9.

As best seen in FIGS. 10 and 11, brace 183 conforms to the exterior shape of the shroud and is bolted at 191 and 193 to vertical plate sections on opposite sides of the step 105 to stiffen one of the welded joints connecting the vertical plate sections with the step. Beam 119 is similar to that shown in FIGS. 7 and 8 with the exception that a lower edge 173 of the beam is vertically spaced from the step 105 a suitable distance to permit mounting of the brace 183 to the vertical plate section above the step.

Referring again to FIG. 9, radial spacers 185, 187 and 189 are flat plate-like members having openings formed through the plates for passage of the tie-rod 121. The spacers are preferably carried by an outer sleeve surrounding the longitudinal members of the tie-rod and are configured to fit between the external shroud surface 117 and the inner surface of the reactor vessel 113; and, together with radial spacer 179, the radial spacers 185, 187 and 189 serve as bumpers or stops restricting lateral movement of upper and lower core supports (not shown) to stabilize the core and assure control rod insertion. Spacers 187 and 189 are separated by a small longitudinal gap to provide clearance for an existing clamp structure (not shown) and are located proximate an inner rim or flange 195 of the shroud upon which the lower core support is typically seated. Spacer 179 is disposed intermediate the upper shroud flange 115 and step 105, upon which the upper core support is typically seated; and spacer 185 is located intermediate the step 105 and the pair of spacers 187 and 189.

Figure 13:
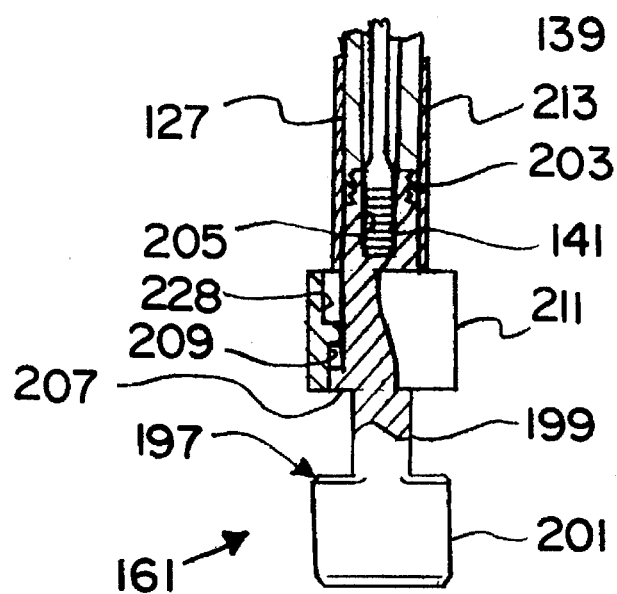
FIG. 13 is a fragmentary side view, partly in section, of a lower end of the tie-rod assembly shown in FIG. 9.

As best seen in FIG. 13, engagement member 161 includes a generally T-shaped rod or bolt 197 having a cylindrical shaft 199 and a cross-member 201 at the bottom end of the shaft. The top end of the shaft 199 includes an externally threaded shoulder portion 203 surrounding an internally threaded hole 205. The bottom end 141 of a spring rod 139 is externally threaded and mounted within the hole 205. Spring rod 139 is disposed within a cylindrical pipe section 127 that is internally threaded at a bottom end and mounted on shoulder 203 of the shaft around spring rod 139. A pin 207 extends radially from shaft 199 and is received within a vertical slot 209 formed on an inside surface of a cylindrical collar 211 surrounding the shaft. A tubular sleeve 213 fits telescopically over the pipe section 127 and threadedly engages the shaft 199 below shoulder 203. A bottom end of the sleeve 213 abuts the top end of the collar 211.

Figure 9:
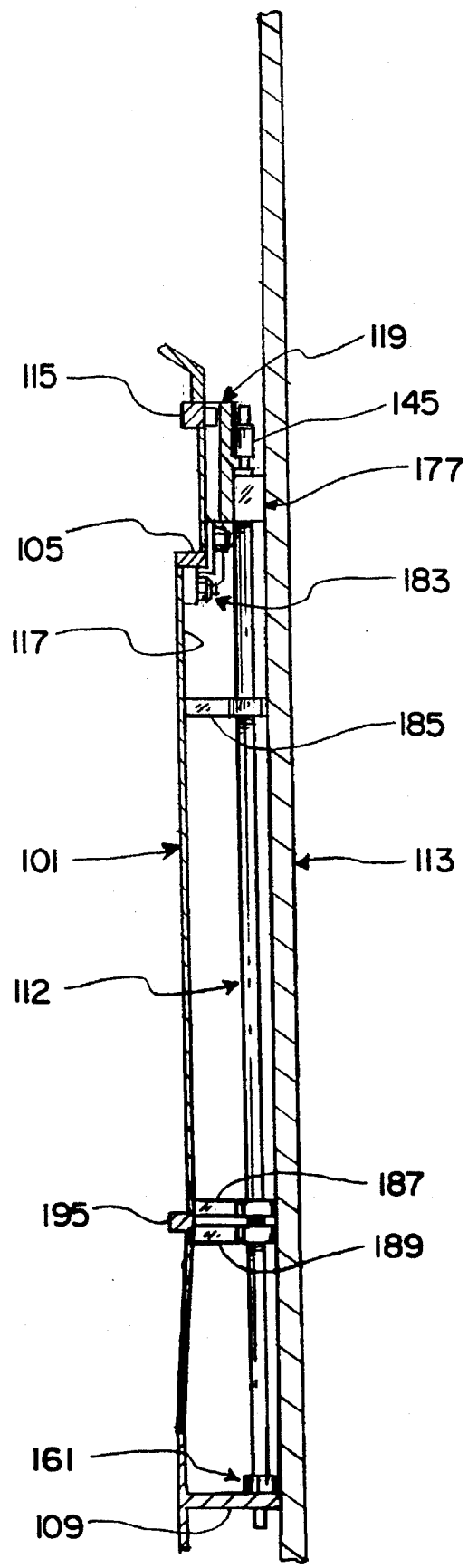
FIG. 9 is a side view, partly in section, of a portion of a reactor shroud repaired using another modified tie-rod assembly according to the present invention.
Figure 12:
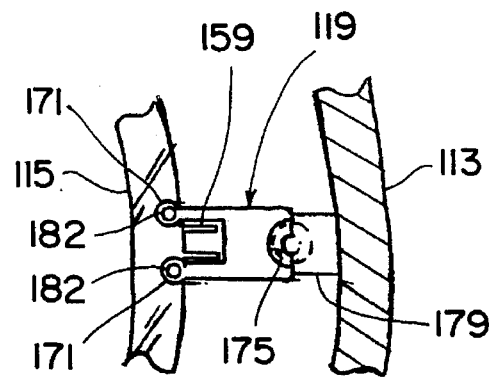
FIG. 12 is a fragmentary top view of the tie-rod assembly of FIG. 9.
Figure 14:
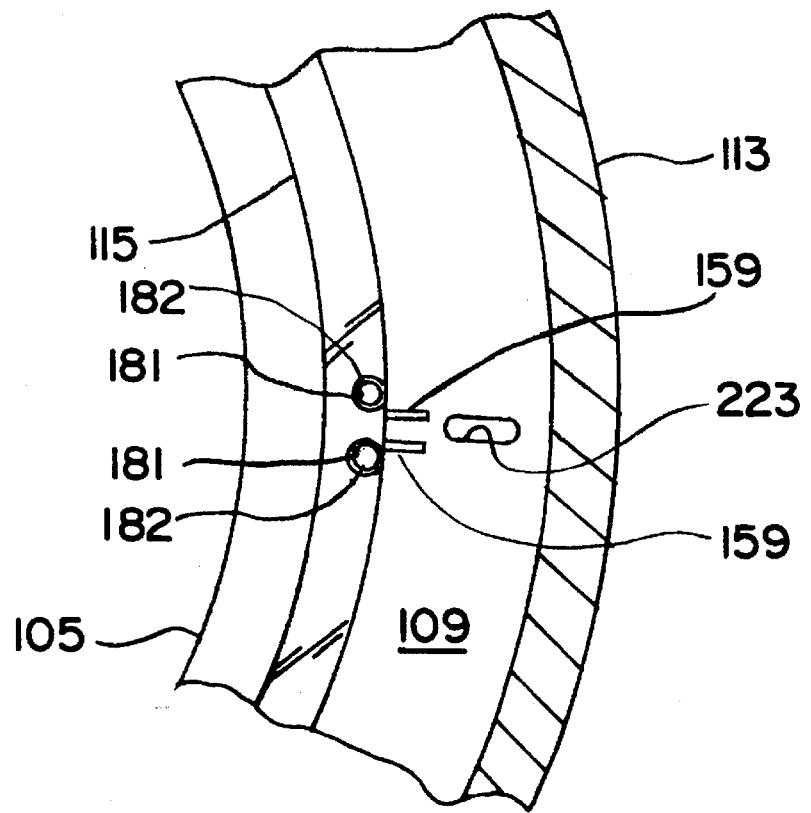
FIG. 14 is a top view of a modified reactor shroud assembly prior to installing the tie-rod assembly of FIG. 9.

The tie-rod 121 shown in FIG. 9 is installed in the following manner. Referring to FIG. 14, a pair of spaced annular grooves 181 are cut or formed in the shroud flange 115 on opposite sides of a pair of existing lugs 159 near an outer edge of the flange to define recessed spaces for receiving the cylindrical beam tabs 171. At the bottom of the shroud 101 and centered beneath the annular grooves 181, support plate 109 is drilled or cut using EDM techniques, for example, to form a radial slit 223 slightly larger in size than the cross-member 201.

A tie-rod 121 is lowered into the annular space between the shroud 101 and vessel 113 with cross-member 201 oriented in the same direction as the radial slit 223 in support plate 109. The cross-member 201 fits through the slit 223 as shown in FIGS. 15A and B and is positioned underneath of the plate 109 when the collar 211 is seated on the top side of the plate as shown in FIGS. 16A and B. The entire tie-rod assembly 121 is then rotated 90° as shown in FIGS. 17A and B so that the cross-member 201 is now oriented perpendicular to the slit 223.

Referring now to FIGS. 18A and B, the tie-rod assembly 121 is lifted, causing the cross-member 201 to abut plate 109 from the underside of the plate and pin 207 to move vertically within slot 209 in the collar. To maintain the lifted condition, sleeve 213 is rotated so as to be threaded against the collar 211 as shown in FIGS. 19A and B and an outer sleeve 225 carrying spacers 179, 185, 187 and 189 is then moved down the sleeve 213, along a splined outer surface of the sleeve for example, to position the radial spacers along the length of the tie-rod. When the bottom end of the outer sleeve 225 reaches the collar 211, a longitudinal finger 227 extending from a bottom end of the outer sleeve protrudes into a second vertical slot 228 formed in the collar to prevent the outer sleeve and radial spacers from rotating.

With the lower end of the tie-rod 121 secured to the support plate 109 and the radial spacers positioned at longitudinally spaced locations along the length of the tie-rod, beam 119 is mounted to the shroud flange 115 by positioning the cylindrical beam tabs 171 within the annular grooves 181. The outer sleeve 225 of the tie-rod assembly is seated within the longitudinal channel 175 formed in the beam 119, and the spring rod 139 is positioned within the boss 177. The tie-rod 121 is then tensioned by threadedly engaging a nut 145 with the top end of the spring rod 139 and tightening the nut against the boss 177 as previously described. The foregoing installation procedure is repeated at a number of angularly spaced locations about the periphery of the shroud to maintain the shroud in compression.

Figure 21:
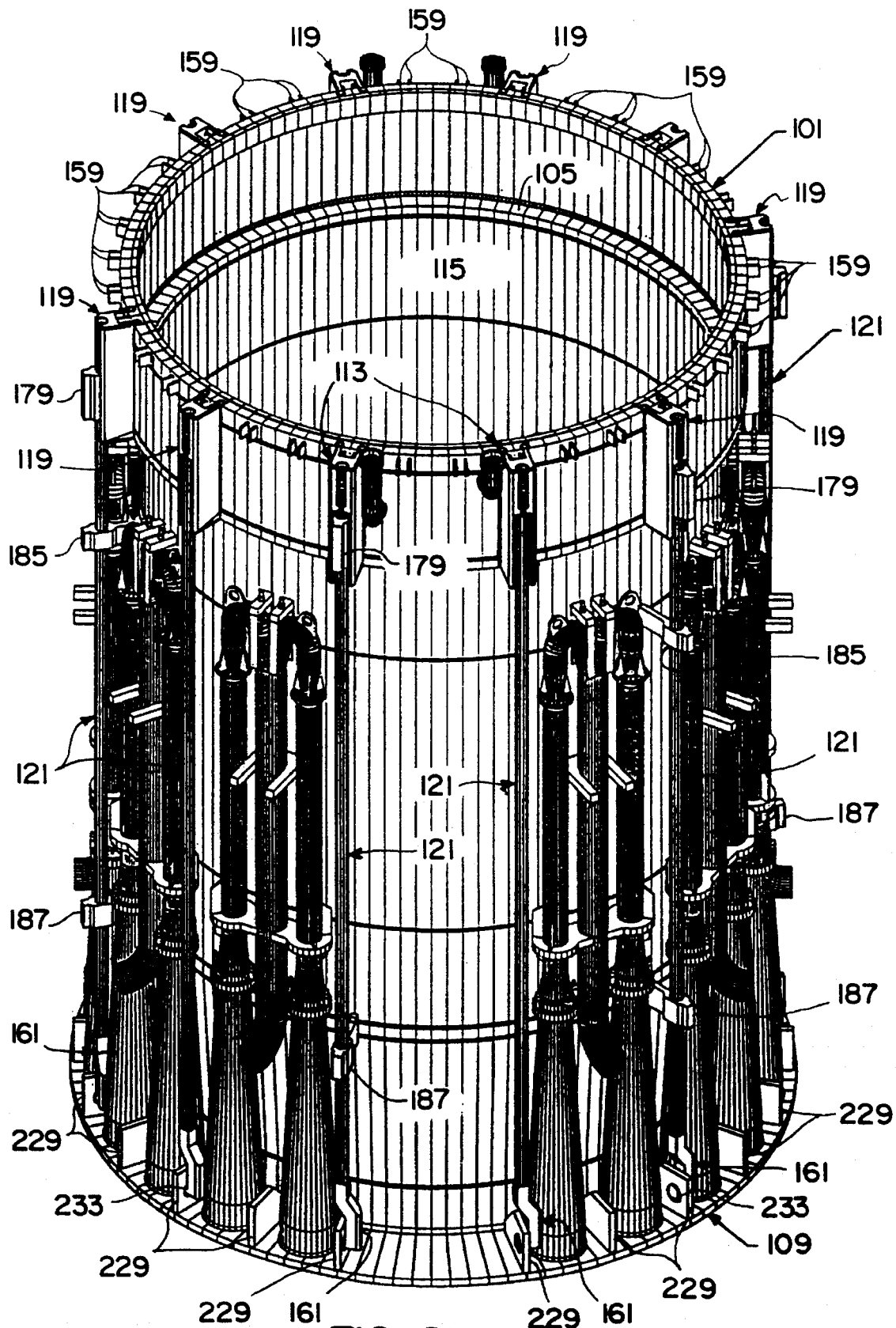
FIG. 21 is a perspective view of a reactor shroud assembly using another modified tie-rod assembly.

Another modified shroud assembly is shown in FIG. 21 wherein the upper end of each tie-rod 121 is held by a beam 119 similar to that shown in FIGS. 7 and 8 and the bottom ends of the tie-rods are attached to pre-existing gussets 229 using modified engagement members 161. The gussets 229 are angularly spaced about the periphery of the shroud support plate 109 and, as best seen in FIG. 22, extend perpendicularly from the plate 109. Each gusset 229 is generally rectangular with a bottom edge 230 affixed to support plate 109, an outer edge 232 abutting the inner surface 111 of the reactor vessel 113, and an angled corner 231 joining a top edge 234 and an inner edge 236 of the gusset. An opening 233 is formed in each gusset proximate the location of a tie-rod 121 and is configured to receive an engagement member 161.

Each engagement member 161 depends from the bottom end of a tie-rod 121 and, as illustrated in FIG. 23, includes a vertical shank portion 235 having a threaded opening 237 at a top end for threadedly engaging the bottom of a spring rod 139 and a generally C-shaped hook 239 extending from a bottom end of the shank portion. The hook 239 includes an upper arm 241 extending almost perpendicularly from shank 235 but at a slight downward angle and terminating at a vertical portion 243 which extends downward from upper arm 241 to a lower arm 245. Lower arm 245 extends perpendicularly from the bottom of vertical portion 243 and terminates at an upwardly-turned portion or nub 247. Pipe section 127 is coaxially disposed around spring rod 139 and is internally threaded to mate with the threaded lower end 141 of the spring rod. An outer sleeve 225 carrying radial spacers 179, 185 and 187 fits over the pipe section and is provided with a longitudinally extending finger 227 at a bottom end to engage the shank portion 235 in order to prevent rotation of the spacers.

Figure 24:
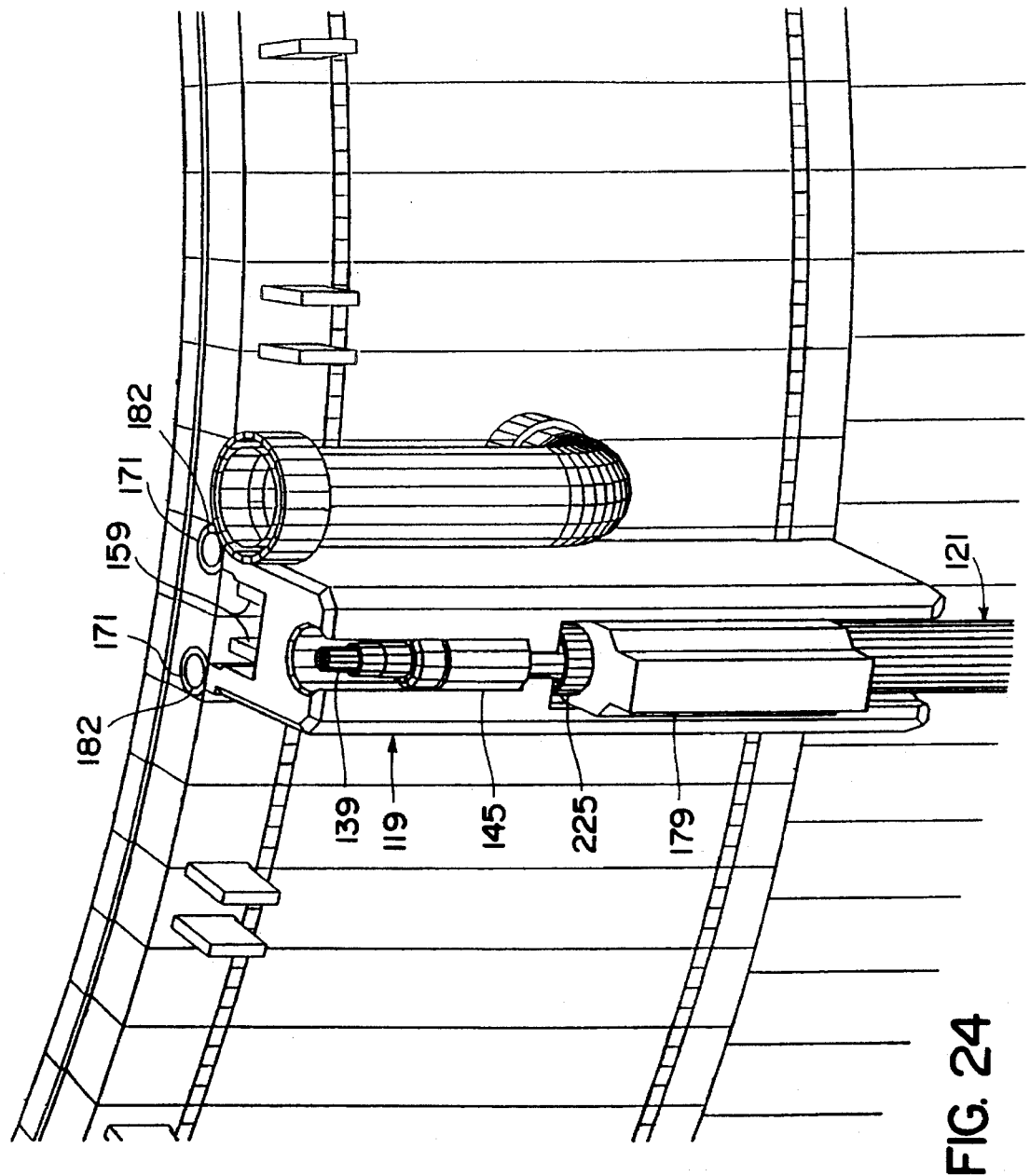
FIG. 24 is an enlarged fragmentary perspective view of a top end of the tie-rod assembly shown in FIG. 21.

Installation of the tie-rods 121 shown in FIGS. 21–23 involves creating openings 233 in a number of existing gussets 229 spaced around the periphery of the shroud 101 and lowering the tie-rods in the annular space between the shroud 101 and vessel 113 with the hooks 239 oriented perpendicularly relative to the gussets. The nub 247 at the end of each hook is then passed through an opening 233 in a gusset 229 to position the lower arm 245 of the hook within the opening. At this point, the outer sleeve 225 carrying radial spacers 179, 185 and 187 is lowered over the tie-rod until the bottom end of the sleeve rests on shank 235. Beams 119 are then installed as shown in FIG. 24 and the tie-rods 121 tensioned in the manner previously described.

Figure 25:
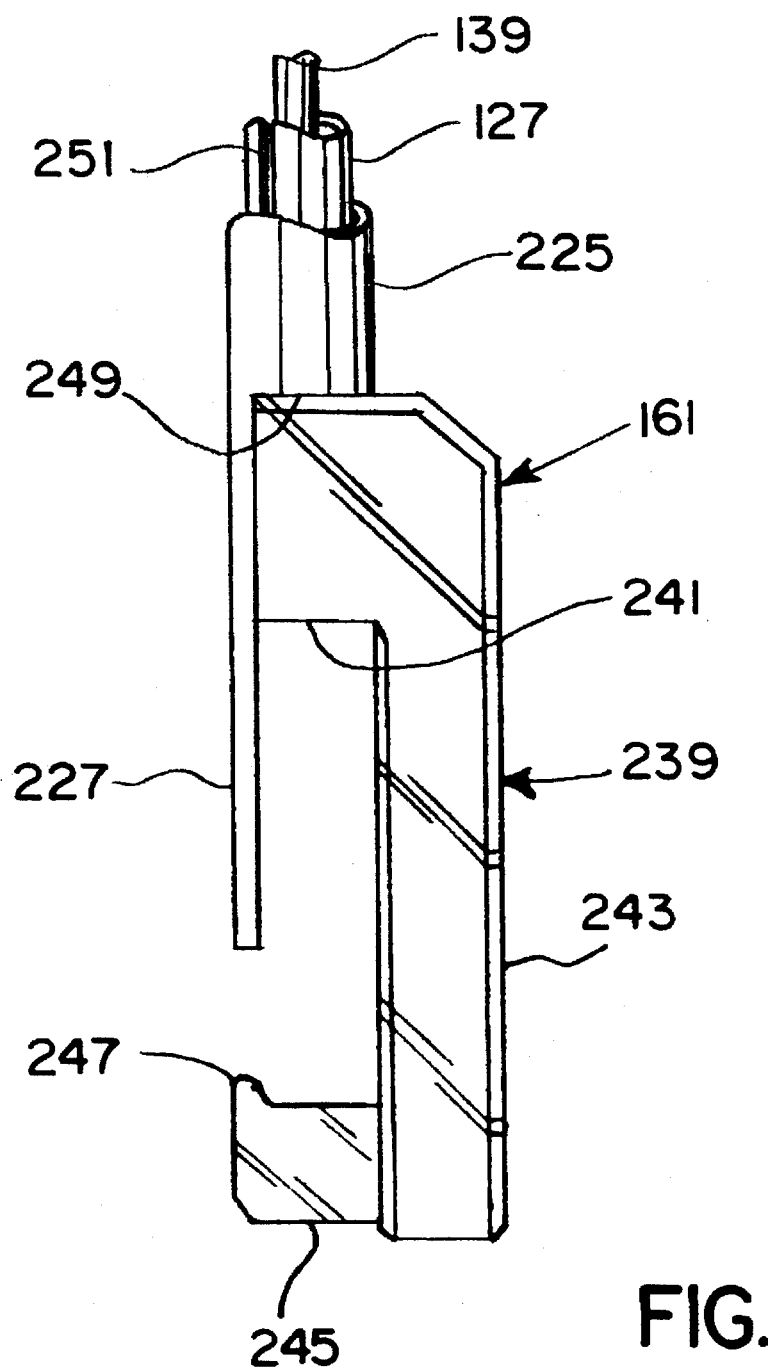
FIG. 25 is an enlarged fragmentary view of the bottom end of another modified tie-rod assembly.
Figure 26:
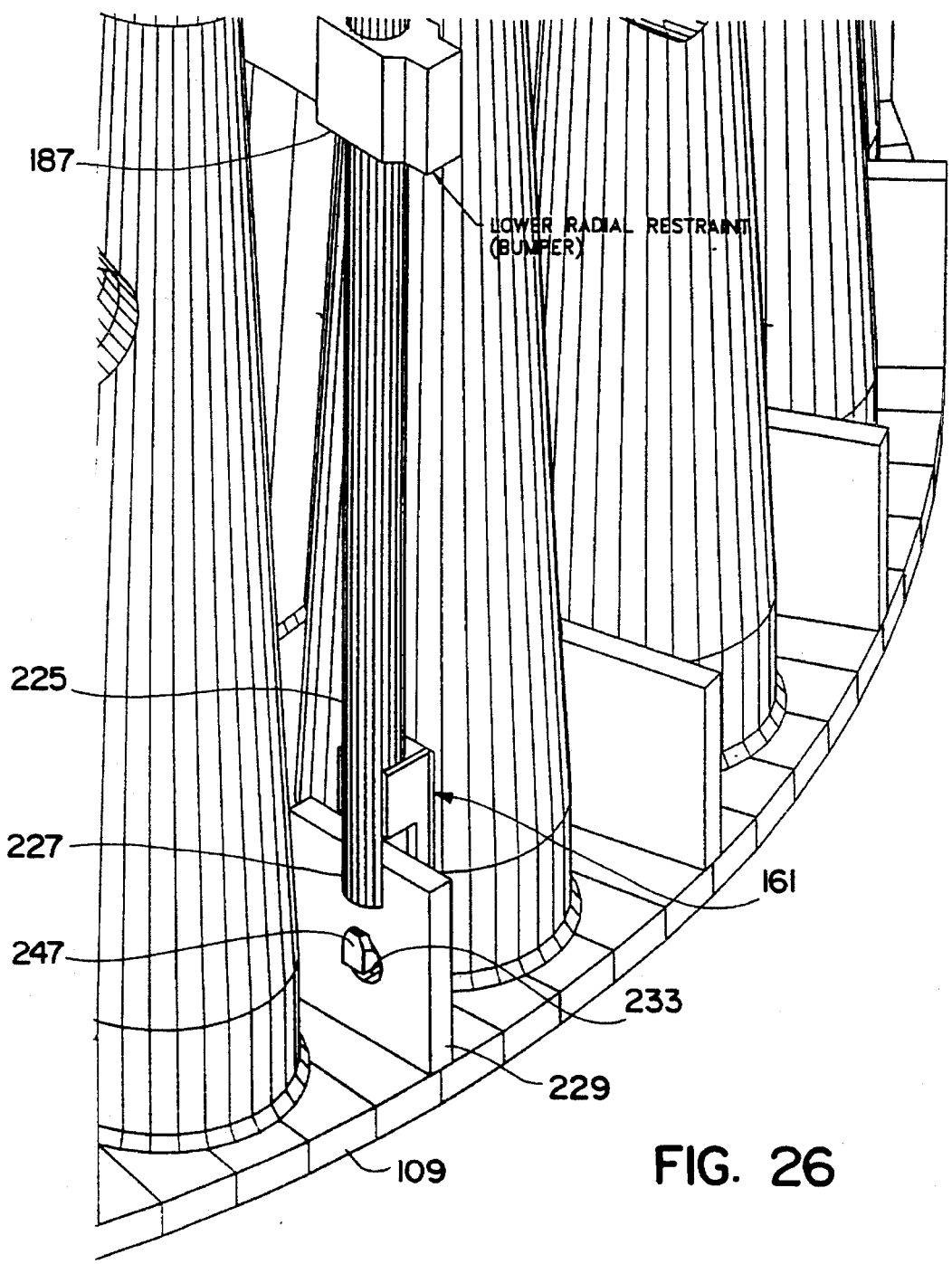
FIG. 26 is an enlarged fragmentary perspective view of the tie-rod assembly of FIG. 25 installed.

FIG. 25 illustrates a modified engagement member 161 and tie-rod 121 for use in a shroud assembly having gussets 229. The modified engagement member 161 is similar to that shown in FIGS. 21, 22 and 23 but with a somewhat shorter upper arm 241 extending from a position radially spaced from the outer sleeve 225 so that a portion of the outer sleeve overhangs the upper arm. A longitudinal notch 249 is formed at a lower end of the outer sleeve 225 and is configured to fit over the upper arm 241 with the remaining end portion of the sleeve forming a finger 227 that extends downward along the gusset 229 as shown in FIG. 26 to prevent rotation of the sleeve 225 and any radial spacers carried by the sleeve. If the outer sleeve 225 is coupled with the pipe section 127, for example by use of splines 251 as shown in FIG. 25, rotation of the pipe section can also be prevented.

Figure 27:
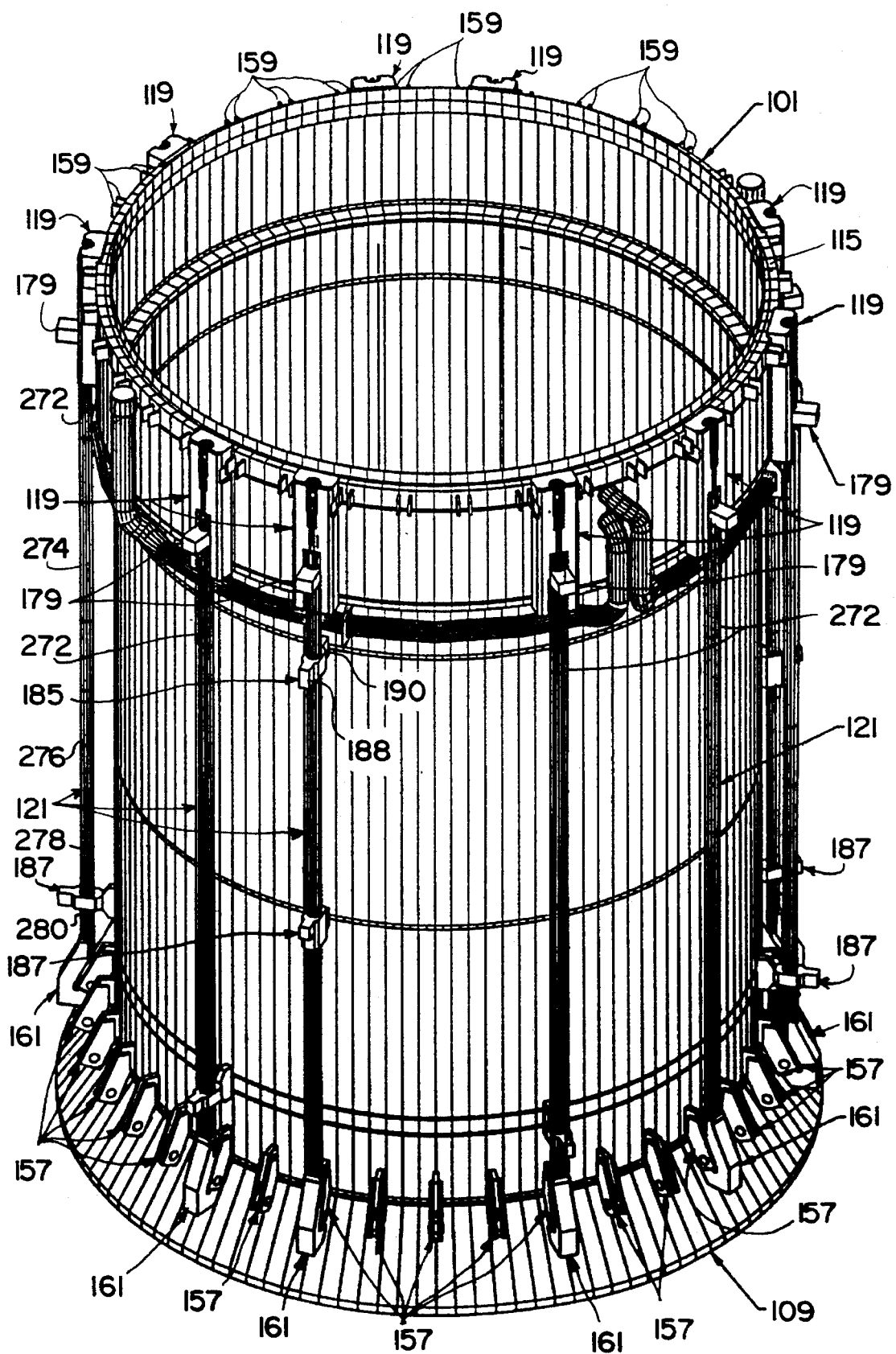
FIG. 27 is a perspective view of another reactor shroud assembly using still another modified tie-rod assembly.
Figure 28:
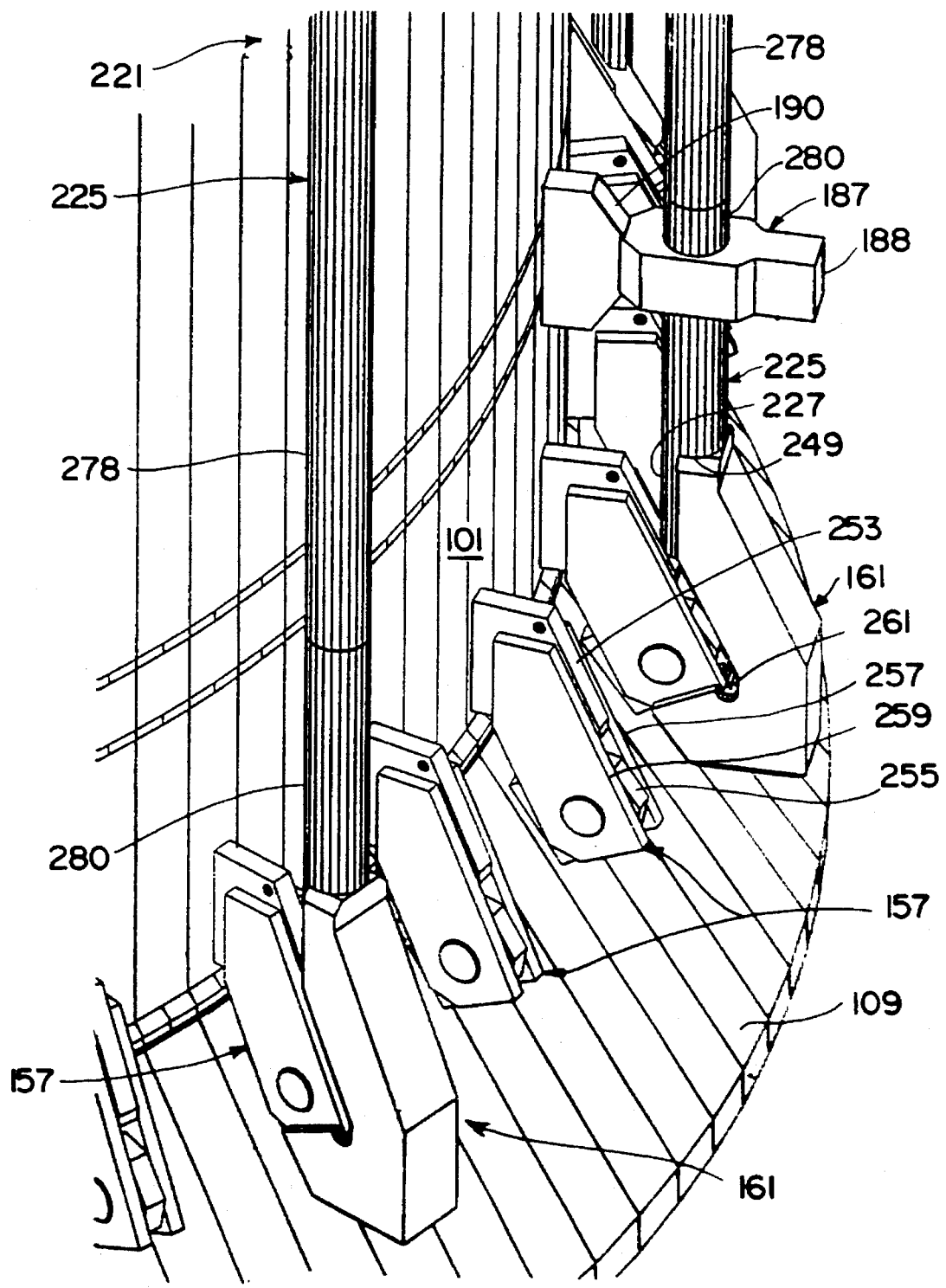
FIG. 28 is an enlarged fragmentary perspective view of the tie-rod assembly of FIG. 27.
Figure 32:
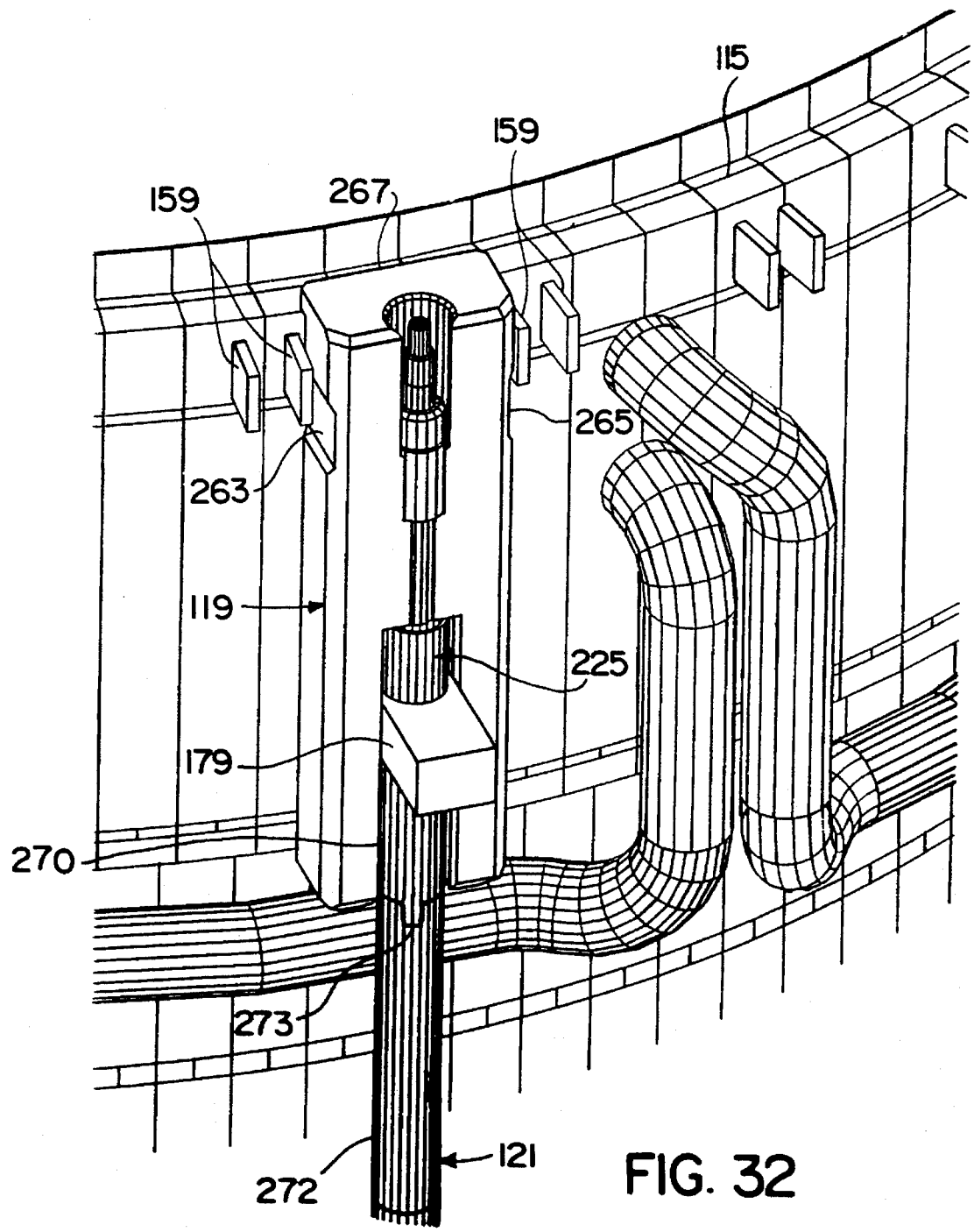
FIG. 32 is an enlarged perspective view of the top end of the tie-rod assembly shown in FIG. 27.

The shroud assembly illustrated in FIG. 27 is similar to that shown in FIGS. 4–6 but with additional radial spacers carried by the tie-rods and a modified beam structure for securing the top ends of the tie-rods to the shroud. Shroud 101 includes pairs of angularly spaced lugs 159 disposed about the periphery of the shroud flange 115 and brackets 157 connected between the lower end of the shroud and a frustoconical support plate 109. As best seen in FIG. 28, each bracket 157 includes generally opposed fins 253 and 255 extending perpendicularly from the lower end of the shroud 101 and the support plate 109, respectively, and a pair of connecting plates 257 and 259 extending diagonally on opposite sides of the fins. Engagement members 161 are generally J-shaped hooks with a lower end of each hook being slotted on an inside surface at 261 to receive a lower edge of a connecting plate 257 or 259. Also in FIG. 28, a lower end of each tie-rod outer sleeve 225 is notched at 249 to fit over a top end of the engagement member 161 preventing rotation of the outer sleeve relative to the engagement member.

Referring now to FIGS. 29–32, each beam 119 includes a pair of horizontal grooves 263 and 265 formed on opposite lateral sides of the beam 119 to provide clearance for accessing the space beneath pre-existing lugs 159 with tools for mounting the steam separator assembly. Additionally, a lip 267 projects from a top inside edge of the beam and is configured to fit over the shroud flange 115 when lugs 159 are positioned just above the grooves 263 and 265. Lip 267 can contact flange 115 directly; or, as will be described in more detail below, lip 267 can be seated atop an annular shim 269 (see FIGS. 36 and 37) to maintain a horizontal flange surface.

With reference to FIG. 29, four radial spacers 179, 185, 187 and 189 are shown being carried on the outer sleeve 225 of the tie-rod 121 and are positioned at spaced locations along the length of the tie-rod to prevent lateral movement of the shroud in the vicinity of certain welds. The spacers 179, 185, 187 and 189 are each carried on one of six individual outer sleeve segments 270, 272, 274, 276, 278 and 280 that mate longitudinally to prevent rotation of the spacers.

Radial spacer 179 is a generally rectangular projection extending perpendicularly from the uppermost outer sleeve segment 270 toward the inner surface of the reactor vessel 113 to serve as a stop limiting lateral movement of the upper core support. Segment 270 extends downward from a top end disposed slightly above spacer 179 to a bottom end with a prong 273 configured to mate with a notched upper end of segment 272. Segment 272 may or may not carry a radial spacer 185 depending on the location of the tie-rod; however, if the segment 272 does carry a spacer 185, the spacer will include a pair of radial projections 188 and 190 extending perpendicularly from opposite sides of the segment to extend between the shroud 101 and the inner surface of the vessel 113 so that the spacer will serve as a stop limiting lateral movement of the shroud in the vicinity of horizontal weld 76. Segment 272, whether or not it carries a spacer, includes a prong 273 at a bottom end which is mated with a notched upper end of segment 274. As shown, segment 274 does not carry a radial spacer but is mated via a prong 273 with segment 276 which carries radial spacer 187 to limit lateral movement of the shroud in the vicinity of horizontal weld 59. Radial spacer 187 is similar to radial spacer 185 but with radial projections 188 and 190 extending from longitudinally offset locations on opposite sides of the segment 276 to provide clearance for existing structures in the reactor. Segment 278 extends between segment 276 and segment 280 and is mated with segment 280 via a prong 273. The lowermost segment 280 carries radial spacer 189, which is similar to radial spacer 185 but with a flared inner projection 190 extending vertically across the lower core support flange 195. Radial spacer 189 extends horizontally between lower core support flange 195 and the inner surface of the vessel 113 to serve as a stop limiting lateral movement of the lower core support. As best seen in FIG. 28, a lower end of segment 280 is notched at 249 to fit over engagement member 161 forming a finger 227 preventing rotation of the individual segments of the outer sleeve 225 and the radial spacers carried thereon.

Figure 36:
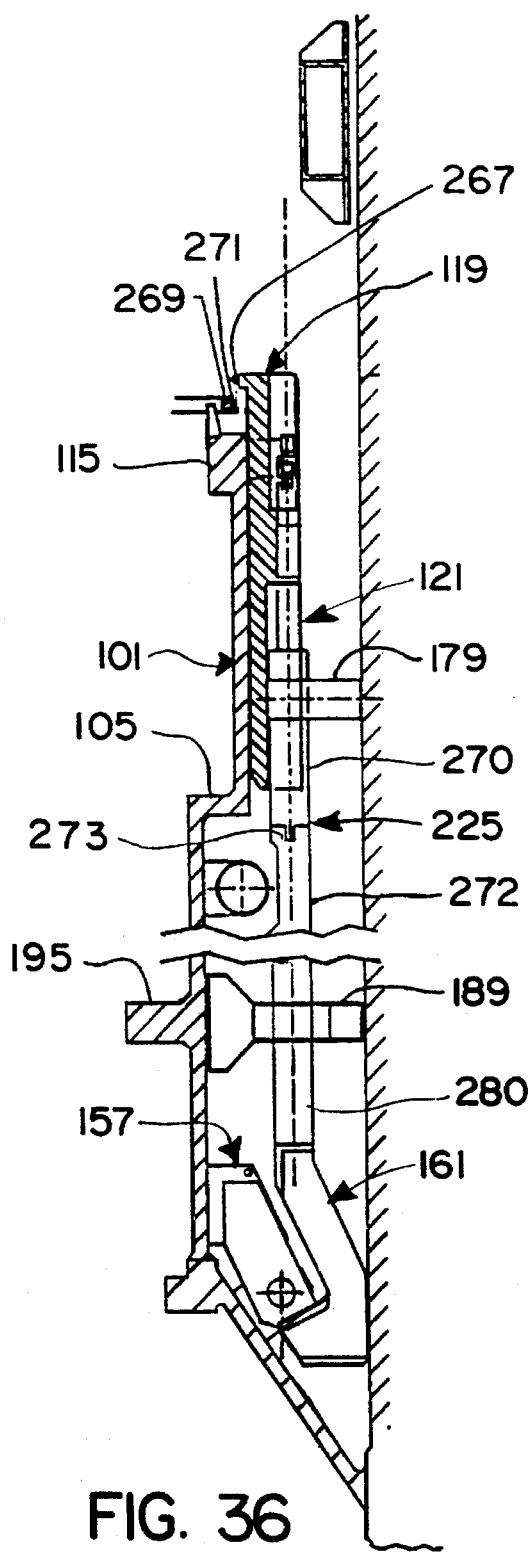
Figure 37:
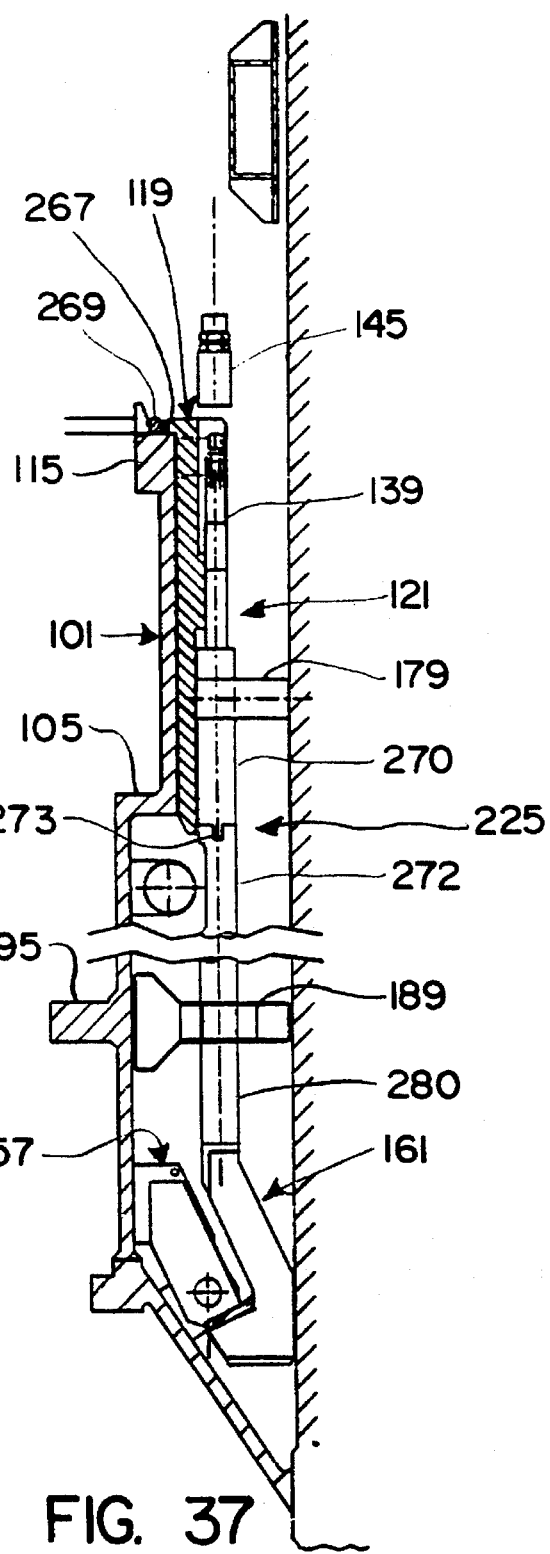

FIGS. 33–37 illustrate the installation sequence for the tie-rod assembly shown in FIG. 27. In FIG. 33, a tie-rod 121 with a J-shaped engagement member 161 is shown being lowered into the annular space between the shroud 101 and the vessel 113 with the engagement member 161 turned 90° relative to its final deployment orientation. In FIG. 34, the tie-rod 121 is rotated 90° to position the lower end 163 of the engagement member 161 beneath a bracket 157. The outer sleeve 225 is installed over the tie-rod 121 in segments, with one or more of the segments (e.g., uppermost and lowermost segments 270 and 280) carrying radial spacers (e.g., spacers 179 and 189) as shown in FIG. 35. Depending on the location of the particular tie-rod being installed, as few as one or as many as four or more radial spacers can be carried by the tie-rod to serve as stops limiting lateral movement of the various shroud sections or levels. An annular shim 269 having an outer shoulder 271 is placed on top of the shroud flange 115 as shown in FIG. 36 and a bracket 119 is lowered between the top end of the tie-rod 121 and the shroud 101 until the lip 267 of the bracket is seated on the shoulder 271 of annular shim 269 to form a horizontal surface on top of the shroud flange 115, as shown in FIG. 37. A nut 145 can then be threaded onto the top end of the spring rod 139 and tightened against boss 177 to tension the spring rod in the manner previously described.

From the above, it will be appreciated that use of coaxial longitudinal members as tie-rods for repairing boiling water reactor shrouds aids in preventing excessive vibration of the tie-rods and helps avoid overstressing of the shroud and its support due to certain thermal transients. By "repair" is meant any preventative or restorative use of tie-rods for axially compressing a reactor shroud; and, by maintaining the reactor shroud in compression, existing cracks can be stabilized and the development of new cracks can be prevented, allowing safe operation and maintenance of the reactor.

The term "coaxial," as used herein, should be broadly construed as meaning one within the other; and when the longitudinal members of the present invention are referred to as being coaxial, it is understood that the inner longitudinal member can be concentrically disposed within the outer longitudinal member to extend along a central longitudinal axis of the outer member, as shown, or that the inner longitudinal member can be eccentrically disposed within the outer longitudinal member to extend along an eccentric longitudinal axis of the outer member. The longitudinal members making up a tie-rod can have any configuration in cross-section, including circular, polygonal and hollow configurations; and, when a longitudinal member is disposed coaxially around an inner longitudinal member, either or both members can have symmetrical or asymmetrical exterior configurations. The coaxial longitudinal member functioning as a "spring rod" is attached between upper and lower portions of the shroud in a preloaded condition and is configured to accommodate thermal transients in the coolant flow without overstressing the shroud. The spring rod can be solid as shown and surrounded by a coaxial longitudinal stiffening member in the form of a pipe section, or can be a hollow tubular member configured to receive a stiffening rod or to be received by a larger stiffening pipe section. The longitudinal stiffening member can be secured at one end to a member engaging the shroud structure, as shown, using any suitable means of attachment such as threaded engagement, or can have opposite ends detached and be suspended around the spring rod and prevented from free axial movement by use of axially spaced annular flanges carried on the spring rod and positioned within end walls or flanges carried by the stiffening member.

Various materials can be used for constructing the spring rod and stiffening pipe section, and depending on the material chosen the cross-sectional area of the spring rod can be tailored to accommodate thermal transients and to maintain a preload sufficient to hold the cracked halves of the shroud together, while the cross-sectional area of the pipe section member will be tailored to withstand accidental loading conditions such as those occurring during a steam line break. Preferably, however, the spring rod is made of a high-strength material such as XM-19 and the remaining components, such as the pipe section, radial spacers, beams and engaging members, are made of a Type 304 stainless steel. Furthermore, the radial gaps between longitudinal members can be communicated with the reactor coolant flow to allow filling of the radial gap with the reactor coolant or the gaps can form closed spaces filled with reactor coolant (typically water) or other suitable damping materials.

Although a variety of different types of attachment of the upper and lower ends of the tie-rods has been described and illustrated, it should be understood that the method of such attachment is not to be limiting. For example, the lower end of the tie-rod can hook onto an existing bracket as shown, be attached to a gusset, or utilize a wedge-type spanning device that automatically wedges itself between the shroud and vessel at the bottom of the shroud, etc.

As noted, in most instances the tie-rods are secured to existing hardware, although hardware may be added, or other suitable means for engagement may be provided for the tie-rods. Similarly, although beams 119 are a convenient structure for securing tie-rods 121 to lugs 159, other means may be employed for the stated purpose, including transverse flanges secured directly to the wall of the shroud, plates extending between the shroud and the reactor vessel wall, brackets having lips overlapping the top surface of the shroud flange 115 and reacting against the reactor vessel wall, brackets hung from grooves or slots formed in the uppermost flange 115 of the shroud, or beams depending from members, other than the lugs, carried by the shroud or the reactor vessel wall.

Although the tie-rods of the present invention have been described as being installed within the annular space between the wall of the shroud and the reactor vessel wall, it will be appreciated that the tie-rods can be installed on either or both sides of the shroud wall to hold the shroud together. Since in most instances the tie-rods are secured to existing hardware, however, installation of the tie-rods in the annular space between the shroud and the reactor vessel wall is particularly advantageous.

When radial spacers are utilized together with the tie-rods of the present invention, any fraction of the total number of tie-rods can carry the spacers, and the tie-rods that carry the spacers can all carry the same number of spacers at similar or different locations along their length or can each carry a different number of spacers at similar or different locations depending on the location of any cracks and the particular position of a given tie-rod. By placement of radial spacers near the upper and lower core support flanges 115 and 195, lateral movement of the upper and lower core support plates is limited to assure control rod insertion. Placement of radial spacers intermediate the upper and lower core support flanges also limits lateral movement of individual shroud plate sections or levels to prevent separation of the levels due to cracking. The radial spacers can have any suitable configuration, including cylindrical, tubular, rectangular and plate-like configurations, and are preferably made of the same material as the shroud (e.g., Type 304 stainless steel). The spacers can be carried on a segmented outer sleeve as shown, on a continuous outer sleeve positioned over an inner sleeve or the coaxial longitudinal members of the tie-rod, or the spacers can be fixed directly to the longitudinal members of the tie-rod. If carried by a segmented outer sleeve, the segments can be configured to mate with each other and/or other structures in a manner to prevent rotation of the spacers. In a preferred embodiment, the spacers will serve as stops limiting lateral movement of any one shroud level to less than about half the wall thickness of the shroud (e.g., about 0.75 inches) so that lateral movement of shroud levels joined by a cracked weld will not create an opening which would allow coolant flow leakage.

The features of the various embodiments described above can be combined in any manner desired dependent upon the particular configuration of the boiling water reactor shroud to be repaired.

For example, any of the beams shown and described herein can be combined with any of the aforementioned engagement members to secure tie-rods to existing shroud structures. Similarly, segmented and unsegmented outer sleeves can be used with any combination of beams and engagement members to carry one or more radial spacers configured to fit within the annular space between a shroud and a reactor vessel wall.

Having described preferred embodiments of a new and improved method and apparatus for repairing boiling water reactor shrouds in accordance with the present invention, it is believed that other modifications, variations and changes will be suggested to persons skilled in the art in view of the teachings set forth herein. It is therefore to be understood that all such variations, modifications and changes are believed to fall within the scope of the present invention as defined by the appended claims.

What is claimed is:

1. A method of repairing a nuclear reactor core shroud having at least one horizontally extending weld joining adjacent shroud plate segments, said method comprising the steps of:

(a) securing a plurality of tie-rods to sites on the shroud adjacent top and bottom portions of the shroud at a respective plurality of angularly spaced locations around the shroud periphery, the tie-rods each having a plurality of coaxial longitudinal members separated by a radial gap; and (b) urging the sites adjacent the top portion of the shroud toward the sites adjacent the bottom portion of the shroud along respective tie-rods.

2. The method of claim 1 wherein step (a) includes the steps of:

(c) attaching a first coaxial longitudinal member of each tie-rod to sites on the shroud adjacent the top and bottom portions of the shroud at a respective plurality of angularly spaced locations around the shroud periphery; and (d) coupling a second coaxial longitudinal member of each tie-rod with the first longitudinal member in a manner to transmit axial loads from the first longitudinal member to the second longitudinal member when the first longitudinal member has axially extended a predetermined distance.

3. The method of claim 2 wherein step (d) includes the steps of:

(e) securing one end of the second longitudinal member to one of the sites on the shroud;

(f) positioning a flange carried by the first longitudinal member intermediate an overlapping flange carried by the second longitudinal member and the secured end of the second longitudinal member; and (g) creating an axial gap between the flanges.

4. The method of claim 2 wherein step (c) includes the step of:

(h) attaching a plurality of beams between pairs of lugs adjacent the top of the shroud, the beams each carrying a boss for receiving a respective first longitudinal member; and (i) threadedly engaging an upper end of each first longitudinal member with a nut bearing against a corresponding boss.

5. The method of claim 4 wherein step (b) includes the step of:

(j) selectively tightening the nuts threadedly engaging each first longitudinal member.

6. The method of claim 5 wherein step (c) further includes the step of:

(k) threadedly engaging a lower end of each first longitudinal member with an engaging member.

7. The method of claim 6 and further comprising the step of:

(l) hooking the engaging member onto a pre-existing bracket secured to the bottom portion of the shroud.

8. The method of claim 6 and further comprising the steps of:

(m) cutting a hole into a support plate secured to the bottom portion of the shroud;

(n) lowering the engaging member through the hole in the support plate; and (o) rotating the engaging member to prevent upward movement of the engaging member through the hole.

9. The method of claim 6 and further comprising the steps of:

(p) cutting a hole in a gusset extending perpendicularly from a support plate secured to the bottom portion of the shroud; and (q) hooking the engaging member to the gusset by passing the engaging member through the hole.

10. The method of claim 1 and further comprising the step of:

(r) filling the radial gap between coaxial longitudinal members with damping fluid.

11. The method of claim 1 and further comprising the step of:

(s) positioning a plurality of radial spacers at longitudinally spaced locations along the length of a tie-rod.

12. The method of claim 11 wherein step (s) includes the step of:

(t) lowering tubular sleeve segments carrying radial spacers over the tie-rod.

13. A boiling water reactor shroud assembly comprising:

a boiling water reactor shroud including a top portion, a bottom portion and a plurality of shroud plate segments welded together along adjacent horizontal edges; and a plurality of tie-rods secured to sites on said shroud adjacent said top and bottom portions at a respective plurality of angularly spaced locations externally of said shroud, said tie-rods each including a plurality of coaxial longitudinal members separated by a radial gap.

14. The boiling water reactor shroud assembly of claim 13 wherein each of said coaxial longitudinal members has axially opposed ends and a first one of said coaxial longitudinal members is secured at both ends to sites on said shroud adjacent said top and bottom portions of said shroud.

15. The boiling water reactor shroud assembly of claim 14 and further comprising means for coupling said first coaxial longitudinal member with a second of said coaxial longitudinal members in a manner to axially load said second coaxial longitudinal member after said first coaxial longitudinal member has axially extended a predetermined amount.

16. The boiling water reactor shroud assembly of claim 15 wherein said coupling means includes first and second axially spaced overlapping flanges carried by said first and second coaxial longitudinal members, respectively.

17. The boiling water reactor shroud assembly of claim 16 wherein one end of said second coaxial longitudinal member is attached to said shroud and said flange carried by said first coaxial longitudinal member is disposed intermediate said attached end of said second coaxial longitudinal member and said flange carried by said second coaxial longitudinal member.

18. The boiling water reactor shroud assembly of claim 13 wherein said radial gap is filled with damping fluid.

19. The boiling water reactor shroud assembly of claim 13 wherein a top end of said first longitudinal member is secured to a beam depending from said top portion of said shroud.

20. The boiling water reactor shroud assembly of claim 13 wherein a lower end of each of said first longitudinal members is secured to means for engaging said bottom portion of said shroud.

21. The boiling water reactor shroud assembly of claim 20 and further comprising a bracket secured to said bottom portion of said shroud, wherein said engaging means is a hook configured to engage an underside of said bracket.

22. The boiling water reactor shroud assembly of claim 20 and further comprising a gusset extending perpendicularly from a support plate secured to said bottom portion of said shroud, wherein said engaging means is a hook configured to engage a hole formed in said gusset.

23. The boiling water reactor shroud assembly of claim 20 and further comprising a support plate secured to said bottom portion of said shroud, wherein said engaging means is a T-head bolt configured to engage a hole formed in said support plate.

24. The boiling water reactor assembly of claim 13 and further comprising a plurality of radial spacers carried at longitudinally spaced locations along the length of at least one tie-rod and extending between said shroud and a wall of said reactor.

25. The boiling water reactor assembly of claim 24 wherein said radial spacers are carried on an outer sleeve surrounding said longitudinal members of said tie-rod.

26. The boiling water reactor assembly of claim 25 wherein said outer sleeve is segmented.

27. The boiling water reactor assembly of claim 25 wherein a lower end of said outer sleeve includes a finger configured to bear against an engaging member attached to a lower end of said tie-rod.

28. In combination, a boiling water reactor shroud and a tie-rod assembly for applying a compressive force to the boiling water reactor shroud, said tie-rod assembly comprising:

a plurality of coaxial longitudinal members separated by a radial gap, wherein each of said coaxial longitudinal members has axially opposed ends;

means for attaching one end of a first of said coaxial longitudinal members to a top portion of the shroud;

means for attaching the other end of said first coaxial longitudinal member to a bottom portion of the shroud;

means for tensioning said first coaxial longitudinal member;

means for coupling said first coaxial longitudinal member with a second of said coaxial longitudinal members in a manner to axially load said second coaxial longitudinal member after said first coaxial longitudinal member has axially extended a predetermined amount; and damping fluid disposed in said radial gap.

29. The combination assembly of claim 28 wherein said coupling means includes first and second axially spaced overlapping flanges carried by said first and second coaxial longitudinal members, respectively.

30. The combination of claim 29 wherein one end of said second concentric longitudinal member is attached to the shroud and said flange carried by said first coaxial longitudinal member is disposed intermediate said attached end of said second coaxial longitudinal member and said flange carried by said second coaxial longitudinal member.

31. The combination of claim 28 and further comprising a plurality of radial spacers carried at longitudinally spaced locations along the length of said tie-rod for extending between the shroud and a wall of the reactor.

32. The combination of claim 31 wherein said radial spacers are carried on an outer sleeve surrounding said longitudinal members of said tie-rod.

33. The combination assembly of claim 32 wherein said outer sleeve is segmented.

34. The combination of claim 32 wherein a lower end of said outer sleeve includes a finger configured to engage said means for attaching the other end of said first longitudinal member.

* * * * *

UNITED STATES PATENT AND TRADEMARK OFFICE
CERTIFICATE OF CORRECTION

PATENT NO.   : 5,600,689
DATED        : February 4, 1997
INVENTOR(S)  : Weems et al It is certified that error appears in the above-identified patent and that said Letters Patent are hereby corrected as shown below:

On the title page, in item [63], delete "which is a" and insert thereof "and".

Signed and Sealed this

Twenty-seventh Day of May, 1997

Attest:

BRUCE LEHMAN

Attesting Officer        Commissioner of Patents and Trademarks